(12) United States Patent
Meyer et al.

(10) Patent No.: US 6,442,677 B1
(45) Date of Patent: Aug. 27, 2002

(54) APPARATUS AND METHOD FOR SUPERFORWARDING LOAD OPERANDS IN A MICROPROCESSOR

(75) Inventors: Derrick R. Meyer, Austin, TX (US); Stephan G. Meier, Sunnyvale; Norbert Juffa, San Jose, both of CA (US)

(73) Assignee: Advanced Micro Devices, Inc., Sunnyvale, CA (US)

(*) Notice: Subject to any disclaimer, the term of this patent is extended or adjusted under 35 U.S.C. 154(b) by 0 days.

(21) Appl. No.: 09/329,497

(22) Filed: Jun. 10, 1999

(51) Int. Cl.[7] .............................................. G06F 9/312
(52) U.S. Cl. ..................................... 712/216; 712/225
(58) Field of Search ......................... 712/32, 216, 225

(56) References Cited

U.S. PATENT DOCUMENTS

| 5,058,048 | A |   | 10/1991 | Gupta et al. ............... 708/508 |
|---|---|---|---|---|
| 5,467,473 | A | * | 11/1995 | Kahle et al. ............... 712/216 |
| 5,646,875 | A |   | 7/1997 | Taborn et al. .............. 708/508 |
| 5,784,586 | A | * | 7/1998 | Simone et al. .............. 712/216 |
| 5,802,588 | A |   | 9/1998 | Ramagopal et al. ........ 711/118 |
| 5,872,990 | A | * | 2/1999 | Luick .......................... 712/24 |
| 5,881,307 | A | * | 3/1999 | Park et al. ................... 710/21 |
| 5,903,479 | A |   | 5/1999 | Schwarz et al. ........... 708/205 |
| 5,940,311 | A |   | 8/1999 | Dao et al. .................. 708/204 |
| 6,035,394 | A | * | 3/2000 | Ray et al. ................... 712/245 |
| 6,070,238 | A | * | 5/2000 | Feiste et al. ................ 712/217 |
| 6,256,726 | B1 | * | 7/2001 | Hotta .......................... 712/213 |
| 6,260,190 | B1 | * | 7/2001 | Ju ................................ 717/7 |
| 6,275,838 | B1 |   | 8/2001 | Blomgren et al. .......... 708/501 |
| 6,286,095 | B1 | * | 9/2001 | Morris ........................ 712/216 |

OTHER PUBLICATIONS

Kumar, A "The HP–8000 RiSC CPU" IEEE Micro Mar./Apr. 1997 pp. 27–32.*
US patent application Ser. No. 09/265230.*
US patent application Ser. No. 09/329718.*

* cited by examiner

Primary Examiner—Eric Coleman
(74) Attorney, Agent, or Firm—Conley, Rose & Tayon, PC; B. Noël Kivlin

(57) ABSTRACT

An apparatus and method for superforwarding load operands in a microprocessor are provided. An execution unit in a microprocessor is configured to receive a load instruction and a subsequent instruction. If the load instruction corresponds to a simple load instruction, a destination operand of the load instruction can be superforwarded to a subsequent instruction if the subsequent instruction specifies a source operand that depends on the destination operand of the load instruction. The subsequent instruction is not required to wait until a load instruction executes or completes and can be scheduled and/or executed prior to or at the same time as the load instruction. Consequently, latencies associated with operand dependencies may be reduced.

22 Claims, 11 Drawing Sheets

| | 0 | 1 | 2 | 3 | 4 | 5 | 6 | 7 |
|---|---|---|---|---|---|---|---|---|
| Load Instruction | RN1 | RN2 | SW | S | S | S | RF | EX |
| Subsequent Instruction | RN1 | RN2 | SW | S | S | S | RF | EX |

↑ Load Tag

| | 0 | 1 | 2 | 3 | 4 | 5 | 6 | 7 |
|---|---|---|---|---|---|---|---|---|
| Load Instruction | RN1 | RN2 | SW | S | S | S | S | RF |
| Subsequent Instruction | RN1 | RN2 | SW | S | S | S | RF | EX |

↑ Load Tag

| | 0 | 1 | 2 | 3 | 4 | 5 | 6 | 7 |
|---|---|---|---|---|---|---|---|---|
| Load Instruction | RN1 | RN2 | SW | S | S | S | RF | EX |
| Subsequent Instruction | | RN1 | RN2 | SW | S | S | RF | EX |

↑ Load Tag

*Fig. 7C* — 730

| | 0 | 1 | 2 | 3 | 4 | 5 | 6 | 7 |
|---|---|---|---|---|---|---|---|---|
| Load Instruction | RN1 | RN2 | SW | S | S | S | RF | EX |
| Subsequent Instruction | | | | | RN1 | RN2 | SW | S |

↑ Load Tag

*Fig. 7D* — 740

APPARATUS AND METHOD FOR SUPERFORWARDING LOAD OPERANDS IN A MICROPROCESSOR

BACKGROUND OF THE INVENTION

1. Field of the Invention

This invention relates generally to the field of microprocessors and, more particularly, to execution units within microprocessors.

2. Description of the Related Art

Microprocessors are typically designed with a number of "execution units" that are each optimized to perform a particular set of functions or instructions. For example, one or more execution units within a microprocessor may be optimized to perform memory accesses, i.e., load and store operations. Other execution units may be optimized to perform general arithmetic and logic functions, e.g., shifts and compares. Many microprocessors also have specialized execution units configured to perform more complex floating-point arithmetic operations including multiplication and reciprocal operations. These specialized execution units typically comprise hardware that is optimized to perform one or more floating-point arithmetic functions.

Many instructions in a microprocessor are configured to perform a function based on one or more operands. These operands may originate from a variety of sources including registers, a cache, or a main memory. Operands that originate from a cache or main memory often involve operand latencies in obtaining the operands from the cache or main memory. The operand latencies can translate into instruction latencies for instructions that depend on the operand. It is generally desirable to reduce these operand and instruction latencies in a microprocessor to achieve increased processor efficiency.

Instructions that are configured to load data into a destination operand are often referred to as load instructions. Load instructions typically specify a memory location as a source operand and copy data from the memory location into a destination operand. At times, the destination operand of a load instruction will be used as a source operand of an instruction subsequent to the load instruction. The source operand of the subsequent instruction can create a dependency on the destination register of the load instruction. As a result, the subsequent instruction may be required to wait until the load instruction executes or completes to access the contents of the destination register of the load instruction. The time that the instruction waits for the load instruction to execute or complete can result in an instruction latency. It would be desirable to reduce the latencies associated with instructions that specify source operands that depend on the destination operand of a load instruction.

SUMMARY

The problems outlined above are in large part solved by an apparatus and method in described herein. Generally speaking, an apparatus and method for superforwarding load operands in a microprocessor are provided. An execution unit in a microprocessor is configured to receive a load instruction and a subsequent instruction. If the load instruction corresponds to a simple load instruction, a destination operand of the load instruction can be superforwarded to a subsequent instruction if the subsequent instruction specifies a source operand that depends on the destination operand of the load instruction. The subsequent instruction is not required to wait until the load instruction executes or completes and can be scheduled and/or executed prior to or at the same time as the load instruction. Consequently, latencies associated with operand dependencies may be reduced.

BRIEF DESCRIPTION OF THE DRAWINGS

Other objects and advantages of the invention will become apparent upon reading the following detailed description and upon reference to the accompanying drawings in which:

FIG. 7A is a chart illustrating a first exemplary timing diagram for instructions in a floating-point execution unit pipeline.

FIG. 7B is a chart illustrating a second exemplary timing diagram for instructions in a floating-point execution unit pipeline.

FIG. 7C is a chart illustrating a third exemplary timing diagram for instructions in a floating-point execution unit pipeline.

FIG. 7D is a chart illustrating a fourth exemplary timing diagram for instructions in a floating-point execution unit pipeline.

Figure 1:
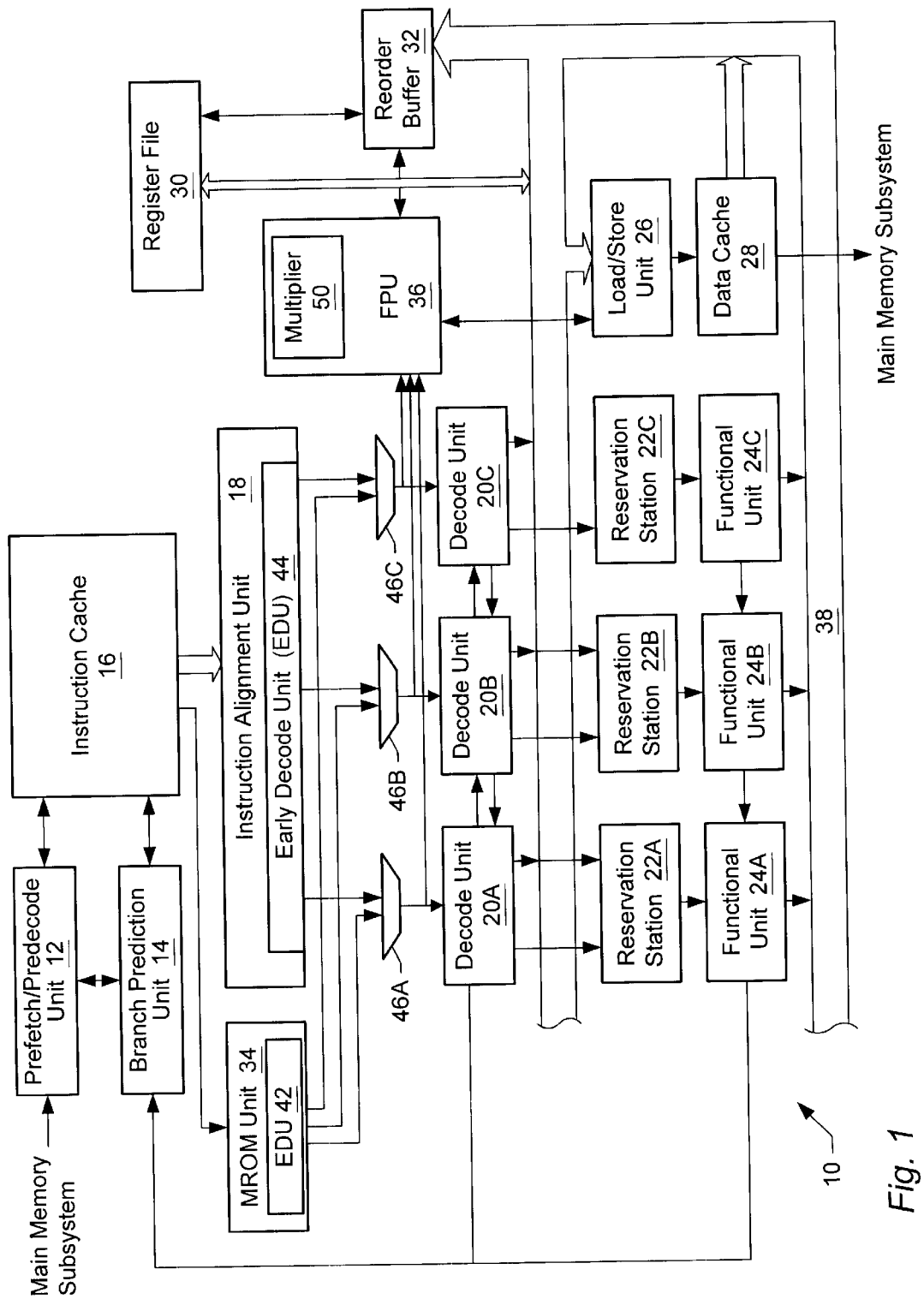
FIG. 1 is a block diagram of one embodiment of an exemplary microprocessor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims.

DETAILED DESCRIPTION OF AN EMBODIMENT

Turning now to FIG. 1, a block diagram of one embodiment of a microprocessor 10 is shown. Microprocessor 10 includes a prefetch/predecode unit 12, a branch prediction unit 14, an instruction cache 16, an instruction alignment unit 18, a plurality of decode units 20A–20C, a plurality of reservation stations 22A–22C, a plurality of functional units 24A–24C, a load/store unit 26, a data cache 28, a register file 30, a reorder buffer 32, an MROM unit 34, and a floating-point unit (FPU) 36, which in turn comprises multiplier 50. Note that elements referred to herein with a particular reference number followed by a letter may be collectively referred to by the reference number alone. For example, decode units 20A–20C may be collectively referred to as decode units 20.

Prefetch/predecode unit 12 is coupled to receive instructions from a main memory subsystem (not shown), and is further coupled to instruction cache 16 and branch prediction unit 14. Similarly, branch prediction unit 14 is coupled to instruction cache 16. Still further, branch prediction unit 14 is coupled to decode units 20 and functional units 24. Instruction cache 16 is further coupled to MROM unit 34 and instruction alignment unit 18. Instruction alignment unit 18, which comprises an early decode unit (EDU) 44, is in turn coupled to decode units 20. Each decode unit 20A–20C is coupled to load/store unit 26 and to respective reservation stations 22A–22C. Reservation stations 22A–22C are further coupled to respective functional units 24A–24C. Additionally, decode units 20 and reservation stations 22 are coupled to register file 30 and reorder buffer 32. Functional units 24 are coupled to load/store unit 26, register file 30, and reorder buffer 32 as well. Data cache 28 is coupled to load/store unit 26 and to the main memory subsystem. MROM unit 34, which also comprises an early decode unit (EDU) 42 is coupled to decode units 20 and FPU 36. Finally, FPU 36 is coupled to load/store unit 26 and reorder buffer 32.

Instruction cache 16 is a high speed cache memory provided to store instructions. Instructions are fetched from instruction cache 16 and dispatched to decode units 20. In one embodiment, instruction cache 16 is configured to store up to 64 kilobytes of instructions in a 2-way set associative structure having 64-byte lines (a byte comprises 8 binary bits). It is noted that instruction cache 16 may be implemented in a fully-associative, set-associative, or direct-mapped configuration.

Instructions are fetched from main memory and stored into instruction cache 16 by prefetch/predecode unit 12. Instructions may be prefetched prior to the request thereof in accordance with a prefetch scheme. A variety of prefetch schemes may be employed by prefetch/predecode unit 12. As prefetch/predecode unit 12 transfers instructions from main memory to instruction cache 16, prefetch/predecode unit 12 generates three predecode bits for each byte of the instructions: a start bit, an end bit, and a functional bit. The predecode bits form tags indicative of the boundaries of each instruction. The predecode tags may also convey additional information such as whether a given instruction may be decoded directly by decode units 20 or whether the instruction is executed by invoking a microcode procedure controlled by MROM unit 34, as will be described in greater detail below. Still further, prefetch/predecode unit 12 may be configured to detect branch instructions and to store branch prediction information corresponding to the branch instructions into branch prediction unit 14.

One encoding of the predecode tags for an embodiment of microprocessor 10 employing a variable byte length instruction set will next be described. A variable byte length instruction set is an instruction set in which different instructions may occupy differing numbers of bytes. An exemplary variable byte length instruction set employed by one embodiment of microprocessor 10 is the x86 instruction set.

In the exemplary encoding, if a given byte is the first byte of an instruction, the start bit for that byte is set. If the byte is the last byte of an instruction, the end bit for that byte is set. Instructions which may be directly decoded by decode units 20 are referred to as "fast path" instructions. The remaining x86 instructions are referred to as MROM instructions, according to one embodiment. For fast path instructions, the functional bit is set for each prefix byte included in the instruction, and cleared for other bytes. Alternatively, for MROM instructions, the functional bit is cleared for each prefix byte and set for other bytes. The type of instruction may be determined by examining the functional bit corresponding to the end byte. If that functional bit is clear, the instruction is a fast path instruction. Conversely, if that functional bit is set, the instruction is an MROM instruction. The opcode of an instruction may thereby be located within an instruction which may be directly decoded by decode units 20 as the byte associated with the first clear functional bit in the instruction. For example, a fast path instruction including two prefix bytes, a Mod R/M byte, and an immediate byte would have start, end, and functional bits as follows:

| Start bits | 10000 |
| End bits | 00001 |
| Functional bits | 11000 |

According to one particular embodiment, early identifying that an instruction includes a scale-index-base (SIB) byte is advantageous for MROM unit 34. For such an embodiment, if an instruction includes at least two bytes after the opcode byte, the functional bit for the Mod R/M byte indicates the presence of an SIB byte. If the functional bit for the Mod R/M byte is set, then an SIB byte is present. Alternatively, if the functional bit for the Mod R/M byte is clear, then an SIB byte is not present.

MROM instructions are instructions which are determined to be too complex for decode by decode units 20. MROM instructions are executed by invoking MROM unit 34. More specifically, when an MROM instruction is encountered, MROM unit 34 parses and issues the instruction into a subset of defined fast path instructions to effectuate the desired operation. MROM unit 34 dispatches the subset of fast path instructions to decode units 20.

Microprocessor 10 employs branch prediction in order to speculatively fetch instructions subsequent to conditional branch instructions. Branch prediction unit 14 is included to perform branch prediction operations. In one embodiment, up to two branch target addresses are stored with respect to each 16 byte portion of each cache line in instruction cache 16. Prefetch/predecode unit 12 determines initial branch targets when a particular line is predecoded. Subsequent updates to the branch targets corresponding to a cache line may occur due to the execution of instructions within the cache line. Instruction cache 16 provides an indication of the instruction address being fetched, so that branch prediction unit 14 may determine which branch target addresses to select for forming a branch prediction. Decode units 20 and functional units 24 provide update information to branch prediction unit 14. Because branch prediction unit 14 stores two targets per 16 byte portion of the cache line, some branch instructions within the line may not be stored in branch prediction unit 14. Decode units 20 detect branch instructions which were not predicted by branch prediction unit 14. Functional units 24 execute the branch instructions and determine if the predicted branch direction is incorrect. The branch direction may be "taken", in which subsequent instructions are fetched from the target address of the branch instruction. Conversely, the branch direction may be "not taken", in which case subsequent instructions are fetched from memory locations consecutive to the branch instruction. When a mispredicted branch instruction is detected, instructions subsequent to the mispredicted branch are discarded from the various units of microprocessor 10. A variety of suitable branch prediction algorithms may be employed by branch prediction unit 14.

Instructions fetched from instruction cache 16 are conveyed to instruction alignment unit 18 and MROM unit 34. As instructions are fetched from instruction cache 16, the corresponding predecode data is scanned to provide information to instruction alignment unit 18 and MROM unit 34 regarding the instructions being fetched. Instruction alignment unit 18 utilizes the scanning data to align an instruction to each of multiplexers 46A–C. In one embodiment, instruction alignment unit 18 aligns instructions from three sets of eight instruction bytes to decode units 20. Similarly, MROM unit 34 is configured to output up to three aligned instructions to multiplexers 46A–C. Note, both instruction alignment unit 18 and MROM unit 34 may each have an early decode unit (EDC) 42 and 44. These units may perform the first steps of the decoding process, e.g., identifying the operand specifiers for each instruction.

Each multiplexer 46A–C is configured to receive a partially decoded instruction (and corresponding decode and predecode information) from instruction alignment unit 18 and MROM unit 34. Each multiplexer 46A–C is configured to select up to one instruction from either instruction alignment unit 18 or MROM unit 34 during each clock cycle. The selected instructions are routed to decode units 20A–C (integer instructions), and FPU 36 (x86 floating-point, MMX, and 3DX instructions). In one embodiment of microprocessor 10, up to three floating-point instructions per clock cycle may be conveyed to floating-point unit 36. As noted above, the instructions may come from MROM unit 34 (microcode instructions) or instruction alignment unit 18 (fast path instructions).

Decode units 20 are configured to complete decoding instructions received from multiplexers 46A–C. Register operand information is detected and routed to register file 30 and reorder buffer 32. Additionally, if the instructions require one or more memory operations to be performed, decode units 20 dispatch the memory operations to load/store unit 26. Each instruction is decoded into a set of control values for functional units 24, and these control values are dispatched to reservation stations 22 along with operand address information and displacement or immediate data which may be included with the instruction.

Microprocessor 10 supports out of order execution, and thus employs reorder buffer 32 to keep track of the original program sequence for register read and write operations, to implement register renaming, to allow for speculative instruction execution and branch misprediction recovery, and to facilitate precise exceptions. A temporary storage location within reorder buffer 32 is reserved upon decode of an instruction that involves the update of a register to thereby store speculative register states. If a branch prediction is incorrect, the results of speculatively-executed instructions along the mispredicted path can be invalidated in the buffer before they are written to register file 30. Similarly, if a particular instruction causes an exception, instructions subsequent to the particular instruction may be discarded. In this manner, exceptions are "precise" (i.e. instructions subsequent to the particular instruction causing the exception are not completed prior to the exception). It is noted that a particular instruction is speculatively executed if it is executed prior to instructions which precede the particular instruction in program order. Preceding instructions may be a branch instruction or an exception-causing instruction, in which case the speculative results may be discarded by reorder buffer 32.

The instruction control values and immediate or displacement data provided at the outputs of decode units 20 are routed directly to respective reservation stations 22. In one embodiment, each reservation station 22 is capable of holding instruction information (i.e., instruction control values as well as operand values, operand tags and/or immediate data) for up to six pending instructions awaiting issue to the corresponding functional unit. It is noted that for the embodiment of FIG. 1, each reservation station 22 is associated with a dedicated functional unit 24. Accordingly, three dedicated "issue positions" are formed by reservation stations 22 and functional units 24. In other words, issue position 0 is formed by reservation station 22A and functional unit 24A. Instructions aligned and dispatched to reservation station 22A are executed by functional unit 24A. Similarly, issue position 1 is formed by reservation station 22B and functional unit 24B; and issue position 2 is formed by reservation station 22C and functional unit 24C.

Upon decode of a particular instruction, if a required operand is a register location, register address information is routed to reorder buffer 32 and register file 30 simultaneously. Those of skill in the art will appreciate that the x86 register file includes eight 32 bit real registers (i.e., typically referred to as EAX, EBX, ECX, EDX, EBP, ESI, EDI and ESP). In embodiments of microprocessor 10 which employ the x86 microprocessor architecture, register file 30 comprises storage locations for each of the 32 bit real registers. Additional storage locations may be included within register file 30 for use by MROM unit 34. Reorder buffer 32 contains temporary storage locations for results which change the contents of these registers to thereby allow out of order execution. A temporary storage location of reorder buffer 32 is reserved for each instruction which, upon decode, is determined to modify the contents of one of the real registers. Therefore, at various points during execution of a particular program, reorder buffer 32 may have one or more locations which contain the speculatively executed contents of a given register. If following decode of a given instruction it is determined that reorder buffer 32 has a previous location or locations assigned to a register used as an operand in the given instruction, the reorder buffer 32 forwards to the corresponding reservation station either: 1) the value in the most recently assigned location, or 2) a tag for the most recently assigned location if the value has not yet been produced by the functional unit that will eventually execute the previous instruction. If reorder buffer 32 has a location reserved for a given register, the operand value (or reorder buffer tag) is provided from reorder buffer 32 rather than from register file 30. If there is no location reserved for a required register in reorder buffer 32, the value is taken directly from register file 30. If the operand corresponds to a memory location, the operand value is provided to the reservation station through load/store unit 26.

In one particular embodiment, reorder buffer 32 is configured to store and manipulate concurrently decoded instructions as a unit. This configuration will be referred to herein as "line-oriented". By manipulating several instructions together, the hardware employed within reorder buffer 32 may be simplified. For example, a line-oriented reorder buffer included in the present embodiment allocates storage sufficient for instruction information pertaining to three instructions (one from each decode unit 20) whenever one or more instructions are dispatched by decode units 20. By contrast, a variable amount of storage is allocated in conventional reorder buffers, dependent upon the number of instructions actually dispatched. A comparatively larger number of logic gates may be required to allocate the variable amount of storage. When each of the concurrently decoded instructions has executed, the instruction results are stored into register file 30 simultaneously. The storage is then free for allocation to another set of concurrently decoded instructions. Additionally, the amount of control logic circuitry employed per instruction is reduced because the control logic is amortized over several concurrently decoded instructions. A reorder buffer tag identifying a particular instruction may be divided into two fields: a line tag and an offset tag. The line tag identifies the set of concurrently decoded instructions including the particular instruction, and the offset tag identifies which instruction within the set corresponds to the particular instruction. It is noted that storing instruction results into register file 30 and freeing the corresponding storage is referred to as "retiring" the instructions. It is further noted that any reorder buffer configuration may be employed in various embodiments of microprocessor 10.

As noted earlier, reservation stations 22 store instructions until the instructions are executed by the corresponding functional unit 24. An instruction is selected for execution if both: (i) the operands of the instruction have been provided; and (ii) the operands have not yet been provided for instructions which are within the same reservation station 22A–22C and which are prior to the instruction in program order. It is noted that when an instruction is executed by one of the functional units 24, the result of that instruction is passed directly to any reservation stations 22 that are waiting for that result at the same time the result is passed to update reorder buffer 32 (this technique is commonly referred to as "result forwarding"). An instruction may be selected for execution and passed to a functional unit 24A–24C during the clock cycle that the associated result is forwarded. Reservation stations 22 route the forwarded result to the functional unit 24 in this case.

In one embodiment, each of the functional units 24 is configured to perform integer arithmetic operations of addition and subtraction, as well as shifts, rotates, logical operations, and branch operations. The operations are performed in response to the control values decoded for a particular instruction by decode units 20. Additionally, functional units 24 may be configured to perform address generation for load and store memory operations performed by load/store unit 26. In one particular embodiment, each functional unit 24 may comprise an execution unit and an independent address generation unit. Such functional units may perform an address generation for conveyance to load/ store unit 26 in parallel with the execution of an integer or branch operation.

Each of the functional units 24 also provides information regarding the execution of conditional branch instructions to the branch prediction unit 14. If a branch prediction was incorrect, branch prediction unit 14 flushes instructions subsequent to the mispredicted branch that have entered the instruction processing pipeline, and causes fetch of the required instructions from instruction cache 16 or main memory. It is noted that in such situations, results of instructions in the original program sequence which occur after the mispredicted branch instruction are discarded, including those which were speculatively executed and temporarily stored in load/store unit 26 and reorder buffer 32.

Results produced by functional units 24 are sent to reorder buffer 32 if a register value is being updated, and to load/store unit 26 if the contents of a memory location are changed. If the result is to be stored in a register, reorder buffer 32 stores the result in the location reserved for the value of the register when the instruction was decoded. A plurality of result buses 38 are included for forwarding of results from functional units 24 and load/store unit 26. Result buses 38 convey the result generated, as well as the reorder buffer tag identifying the instruction being executed.

Load/store unit 26 provides an interface between functional units 24 and data cache 28. In one embodiment, load/store unit 26 is configured with a pre-cache load/store buffer having twelve storage locations for data and address information for pending loads or stores and a post-cache load/store buffer having 32 entries. Decode units 20 arbitrate for access to the load/store unit 26. When the buffer is full, a decode unit must wait until load/store unit 26 has room for the pending load or store request information. Load/store unit 26 also performs dependency checking for load memory operations against pending store memory operations to ensure that data coherency is maintained. A memory operation is a transfer of data between microprocessor 10 and the main memory subsystem. Memory operations may be the result of an instruction which utilizes an operand stored in memory, or may be the result of a load/store instruction which causes the data transfer but no other operation. Additionally, load/store unit 26 may include a special register storage for special registers such as the segment registers and other registers related to the address translation mechanism defined by the x86 microprocessor architecture.

Data cache 28 is a high speed cache memory provided to temporarily store data being transferred between load/store unit 26 and the main memory subsystem. In one embodiment, data cache 28 has a capacity of storing up to sixty-four kilobytes of data in a two way set associative structure. It is understood that data cache 28 may be implemented in a variety of specific memory configurations, including a set associative configuration.

Figure 2:
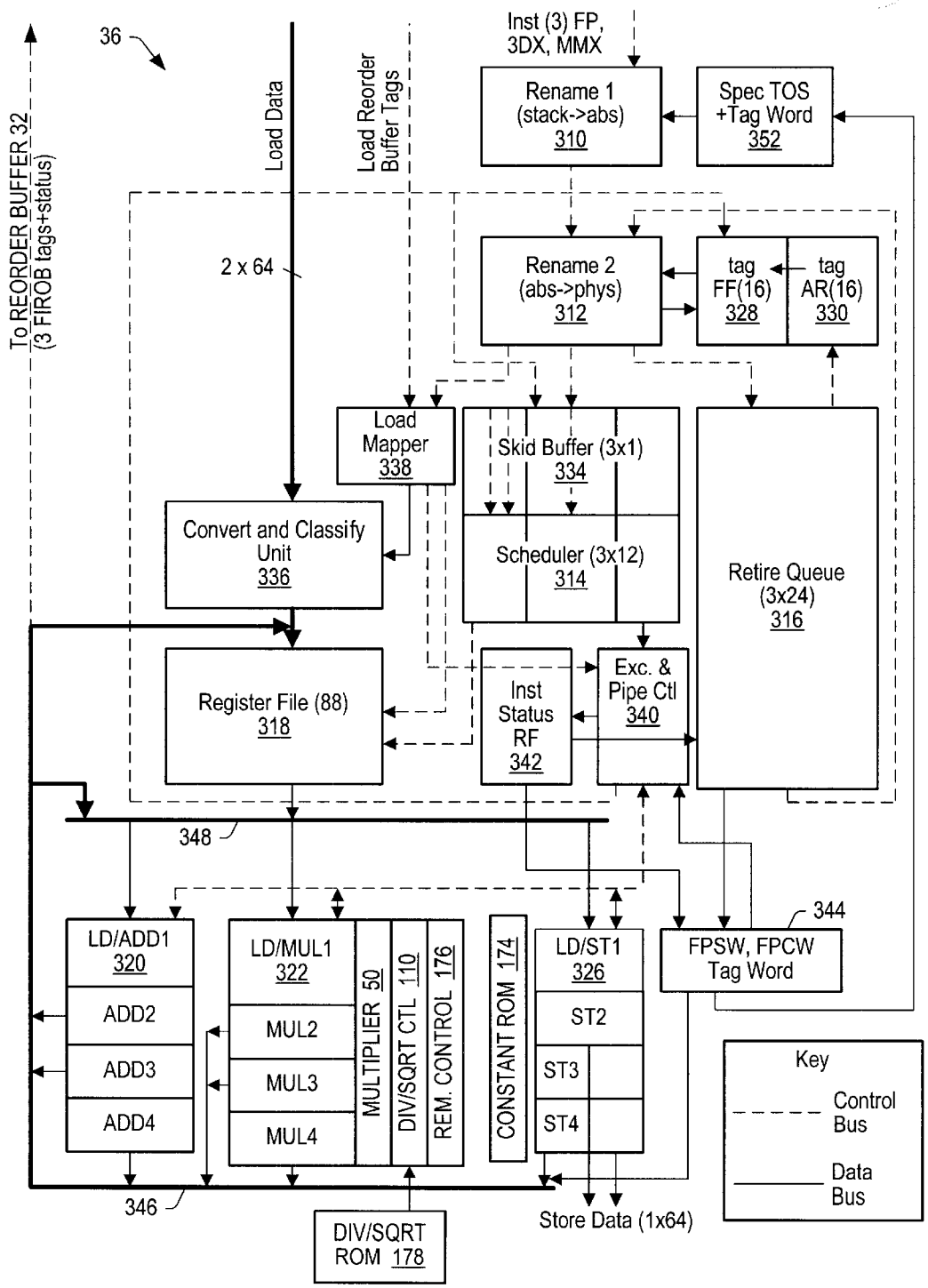
FIG. 2 is a block diagram of one embodiment of a floating-point unit from the exemplary microprocessor of FIG. 1.

Turning now to FIG. 2, details of one embodiment of FPU 36 are shown. Other embodiments are possible and contemplated. FPU 36 is a high performance out-of-order execution unit capable of accepting up to three new instructions per clock cycle. The three instructions may be any combination of x86 floating-point instructions, MMX instructions, or 3DX instructions. MMX and 3DX instructions are extensions to the standard x86 instruction set. One example of a 3DX instruction set extension is the 3DNow!™ extension from Advanced Micro Devices, Inc. MMX instructions are geared toward multimedia and two-dimensional graphic applications, while 3DX instructions are optimized for performing three-dimensional graphic manipulations such as rendering and texture mapping. Many 3DX instructions are vectored instructions that perform the same operation on a number of independent pairs of operands.

As the figure illustrates, this embodiment of FPU 36 comprises the following components: a rename-1 unit 310, a rename-2 unit 312, a scheduler 314, a retire queue 316, a register file 318, a load/add execution pipeline 320, a load/multiply execution pipeline 322, a load/store execution pipeline 326, a skid buffer 334, a convert and classify unit 336 and a load mapper 338. Rename-1 unit 310 is coupled to rename-2 unit 312 and is configured to receive a speculative top of stack (TOS) tag and tag word 352. Rename-2 unit 312 is coupled to future file tag array 328, architectural tag array 330, retire queue 316, skid buffer 334, scheduler 314, and load mapper 338. Convert and classify unit 336 is also coupled to load mapper 338, which in turn is coupled to execution and pipeline control unit 340 along with instruction status register file 342 and scheduler 314. Register file 318 receives inputs from convert and classify unit 336, load mapper 338 and scheduler 314, and outputs data to source operand bus 348. Source operand bus 348 is in turn coupled to execution pipelines 320, 322, and 326. Finally, execution pipelines 320, 322, and 326, and floating-point status/control/tag words 344 are all coupled to result bus 346. While floating-point status/control/tag words 344 and speculative top of stack and tag word 352 are shown separately in the figure for explanatory purposes, these tags may be stored together with future file tags 328 and architectural register tags 330 in a single storage location, e.g., within register file 318, execution and pipeline control unit 340, or retire queue 316.

Rename-1 unit 310 receives up to three instructions per clock cycle. As previously noted, these may be any combination of floating-point, MMX, or 3DX instructions. Rename-1 unit 310 converts stack-relative registers into absolute register numbers. For instructions with memory operands, e.g., FLD instructions (floating-point load), no conversion is necessary and the source operand can be identified as being from memory rather than a register. The x86 instruction set and architecture defines eight floating-point registers that are accessed in a stack-like manner (i.e., relative to a top-of-stack pointer). Rename-1 unit 310 also assigns each instruction to one of three execution pipelines, either load/store execution pipeline 326, load/add execution pipeline 320, or load/ multiply execution pipeline 322 and, if necessary, converts each instruction to an internal format.

Rename-2 unit 312 performs true register renaming. Upon receiving the instructions from rename-1 unit 310, rename-2 unit 312 reads three register tags from a "free list" of the available registers stored within retire queue 316. Once the registers have been read, rename-2 unit 312 assigns one to the destination register of each instruction. To rename the source registers, rename-2 unit 312 indexes tag future file 328 using the absolute register number for each source register. Tag future file 328 stores tags that identify which registers store the current speculative future state of each of the sixteen architectural registers in FPU 36. Similarly, architectural register tag file 330 stores tags which identify which registers within register file 318 store the current architectural (non-speculative) state of FPU 36. Note, of the sixteen registers that define FPU 36's state (architectural or speculative), eight are architectural registers (i.e., floating-point stack or MMX registers) and eight are micro-architectural registers (i.e., registers that store internal state information that is not generally accessible to the programmer). The old destination register tags are then read from the tag future file 328 and written to the tail of the free list. Finally, tag future file 328 is updated by storing tags for the new destination registers.

Memory operands may be handled by assigning them the same register tag as the destination register. This is because load data will be converted and directly written into the destination register when it is received from load/store unit 26. In the case of an FLD instruction, no further processing is required (except in certain exceptional cases), although the FLD instruction is still assigned to an execution pipeline for the purpose of handling exceptions and signaling completion to reorder buffer 32.

Once the three instructions have passed through rename-1 unit 310 and rename-2 unit 312, the instructions are represented in a three operand format (i.e., first source operand, second source operand, and destination operand). While the first source operand is always a register operand, a bit in the opcode may be used to indicate whether the second operand is a register operand or a memory operand.

From rename-2 unit 312 the instructions are passed to scheduler 314, where the three instructions are allocated a "line" of storage. If scheduler 314 is full, the instructions may be stored in skid buffer 334 until such time as there is room within scheduler 314. After receiving the three instructions, scheduler 314 snoops result bus 346 and source operand bus 348. Scheduler 314 may also snoop load data bus. Concurrently with allocating the line of storage and snooping, retire queue 316 allocates one entry for each instruction. The entries store the destination register tags, the absolute destination register number, and the old destination register tags. Additional information may also be included, e.g., information that may be needed to update the architectural state at retire time.

On the cycle following their entry into scheduler 314, the instructions are available for scheduling. Scheduler 314 examines all of the stored instructions and issues the oldest instructions which meet the following criteria: (1) the execution pipeline to which the instruction has been assigned is available, (2) the result bus for that execution pipeline will be available on the clock cycle in which the instruction will complete (this is dependent upon the latency of the particular instruction), and (3) the instruction's source registers and or memory operands are available. In this embodiment, scheduler 314 may schedule up to three instructions per clock cycle. Each of the three execution pipelines 320, 322, and 326 may accept a new instruction every clock cycle. Note other embodiments capable of scheduling four or more instructions are also possible and contemplated.

Once all three entries in a line are scheduled, that line is free to be compacted out of scheduler 314. When the instructions are conveyed from scheduler 314 to their respective instruction execution pipeline, their source operands are read. In some cases, the source data will come from a register, while in other cases the source data will come from a "bypass". A bypass refers to the practice of result forwarding or superforwarding. Result forwarding involves conveying the results from a recently executed instruction directly to other instructions that depend upon that result. Result forwarding allows the result to be used in subsequent instructions without having to wait for the result to be stored in a register and having to read the result from the register. Result superforwarding will be described in more detail below.

Each execution pipeline 320, 322, and 326 may be configured as a four-stage pipeline. In the first stage of each pipeline, the result buses are read and the input data is taken from either the source operand bus (if the data is within register file 318) or the result bus (if a bypass is being performed). Once the source data has been received, each execution pipeline may begin performing the appropriate computation.

In the embodiment shown in the figure, execution pipeline 320 is configured to perform load and addition operations, execution pipeline 322 is configured to perform load and multiplication operations, and execution pipeline 326 is configured to perform load and store operations. Both execution pipelines 320 and 322 may be configured to perform certain MMX instructions. Execution pipeline 322, which comprises multiplier 50, may also be configured to perform iterative calculations that involve multiplication, e.g., reciprocal operations, division operations, and square root operations, under the control of control unit 110, division/square root ROM 178, and, if a remainder is called for, remainder control unit 176. Constant ROM 174 is a read only memory configured to store a plurality of constants for load constant instructions such as FLDPI, for transcendental computation, for FPU 36 self-checking, and for certain special and exceptional results. Division/square root ROM 178 is a read only memory which stores constants used to determine initial values for division and square root computations and constants returned by certain 3DNow! instructions. Control unit 110 provides sequence information for division and square root functions. Note, in some embodiments control unit 110 may be part of execution and pipeline control unit 340.

In some cases, instruction operands or the results generated by executing an instruction may be too small to fit within the operand or result's standard data format. These numbers are referred to as "denormals". While normalized floating-point values have a non-zero exponent and a one in the most significant bit of the significand, i.e., the bit directly to the left of the binary radix point (e.g., 1.001010 . . . ), denormals are represented with a zero exponent and a zero in the most significant bit of the significand (e.g., 0.000101 . . . ). Denormal load data is detected and tagged by convert and classify unit 336. Denormal results generated during execution within execution pipelines 320, 322, and 326 are tagged when they are generated. Execution and pipeline control unit 340 detects the presence of the denormal tags and calls an appropriate microcode routine from MROM 34 to handle the denormal data.

At the end of the final execution stage, the data is placed on result bus 346. This makes the result data available for an instruction entering the first stage of one of the instruction execution pipelines during the next clock cycle. Once the data is on the result bus, it may also be written into register file 318. Instead of being stored in register file 318, store data is sent to the load/store unit 26. The reorder buffer tag and any exception information is sent back to reorder buffer 32. At this point, the instructions are complete. However, they are still speculative. When the instructions reach the bottom of reorder buffer 32 (assuming there is no branch misprediction or exception abort), reorder buffer 32 notifies FPU 36 that the instructions should be retired. The speculative state of the floating-point unit 36 is committed to the architectural state when retire queue 316 updates the tags for the architectural register file 328, and the destination register tags in retire queue 316 are written to the architectural register file 318.

Convert and classify unit 336 receives all load data, classifies it by data type, and converts it to an internal format if necessary. In one embodiment, convert and classify unit 336 appends a three bit classification tag to each data item. The three bit tag classifies the accompanying data as one of the following eight potential data types: (1) zero, (2) infinity, (3) quiet NaN, (4) signaling NaN, (5) denormal, (6) MMX, (7) normal, or (8) unsupported. NaN is a standard abbreviation for "Not-a-Number". While representations may vary across different implementations, zero data types are typically represented with a zero exponent and a zero significand. Similarly, infinity data types are typically represented with an exponent comprising all asserted ones. A quiet NaN ("QNaN") is generated whenever a floating-point instruction causes an invalid operation, e.g., a square root operation on a negative number. A signaling NaN ("SNaN"), unlike a quiet NaN, generates an exception when used. Signaling NaNs are not generated by FPU 36 and are typically only used by programmers to signal particular error conditions. The table below illustrates the characteristics of each data type for x86 compatible floating-point units (wherein "x" represents either a one or a zero):

| Sign | Exponent | Significand | Value |
| --- | --- | --- | --- |
| x | $00 \ldots 00_2$ | $0.00 \ldots 00_2$ | Zero |
| x | $11 \ldots 11_2$ | $1.00 \ldots 00_2$ | Infinity |
| x | $11 \ldots 11_2$ | $1.1xx \ldots xx_2$ | QNaN |
| x | $11 \ldots 11_2$ | $1.0xx \ldots xx_2$ | SNaN |
| x | $00 \ldots 00_2$ | $0.xx \ldots xx_2$ | Denormal |

It is noted that these data types may conform to the IEEE-754 specification.

MMX data types are 64 bits wide and comprise either eight packed 8-bit bytes, four packed 16-bit words, or two packed 32-bit double-words. MMX data types may be detected by the MMX opcodes which precede them. Normal data types are standard floating-point values that are either single precision, double precision, or extended precision (before they are translated into an internal data format) and that do not have the characteristics of any of the previously described data types. Unsupported data types are extended precision bit patterns that do not fall into any of the previously described data types and that fall outside of the normal data type as defined by IEEE Standard 754. For example, an extended precision bit sequence having a 0 sign bit, a biased exponent of 11 . . . 11, and a significand in the format (f.ff . . . ff) of 0.11 . . . 11 is an unsupported value. Note, however, in other embodiments larger or smaller classification tags and additional or fewer data types may be implemented.

The data types and exemplary formats illustrated above describe the data as it is received and identified by convert and classify unit 336. Once convert and classify unit 336 classifies the data, the classification tag may be used to identify some or all of the data's properties. For example, if a value is classified as a zero, it may be identified solely by its classification tag instead of having to perform a wide comparison of each bit in the exponent and significand portions of the value. The classification tags may accompany the data throughout FPU 36 and may be stored in register file 18 along with the data.

As discussed above, when data from a load instruction is received by FPU 36, the data is routed to convert and classify unit 336. A corresponding reorder buffer tag accompanies the data and is routed to load mapper 338. As previously noted in the description of microprocessor 10, the reorder buffer tag identifies the sequence in which out of order instructions should be retired (i.e., committed to architectural state). For load instructions, the reorder buffer tag follows the data from load/store unit 26 to FPU 36. Load mapper 338 receives the reorder buffer tag and translates it into a physical register tag. The physical register tag indicates which data register within register file 318 the corresponding data is to be loaded into.

Execution and pipeline control unit 340 tracks the status of each stage in execution pipelines 320, 322, and 326. Execution and pipeline control unit 340 contains timing information enabling it to determine the future availability of each execution pipelines. For example, when an FMUL (floating-point multiply) instruction begins execution in multiplication execution pipeline 322, control unit 340 uses its stored timing information to notify scheduler 314 that the result will be available for output on result bus 346 four clock cycles later. This timing information allows scheduler 314 to efficiently schedule instruction for execution in execution pipelines 320, 322, and 326. Control unit 340 also tracks the status of each pipe stage, receiving and prioritizing exceptions from execution pipelines 320, 322, and 326.

FPU status word, control word, and tag word (collectively, words 344) are stored within retire queue 316 and indicate which of the status and control registers within register file 318 contain the FPU's current architectural state. For example, in one embodiment register file 318 may comprise 88 registers, i.e., 16 registers to store the current architectural state of FPU 36 (see below), and 72 speculative registers to store the speculative state of FPU 36. Of the 72 speculative registers, 16 of them store the "current" speculative state. Of each set of 16 registers that store a particular state of FPU 36 (whether the state is architectural or speculative), eight registers are FPU stack registers and eight registers are micro-architectural registers that store state information that is only accessible to microcode instructions within FPU 36, i.e., they are not accessible to the programmer and store only internal state information. In one embodiment, each register in register file 314 is 90 bits long, with 87 bits providing storage for internal format data (e.g., one sign bit, 18 exponent bits, and a 68-bit significand) and 3 class bits.

Instruction status register file 342 stores information for execution and pipeline control unit 340. As a result of instructions executing out of order in FPU 36, exceptions that occur within execution pipelines may need to be stored until the instructions generating them are the next to be retired. Retire queue 316 reads instruction status register file 342 when it retires instructions and updates the architectural floating-point status word (FPSW) and floating-point control word (FPCW) and tag word (collectively, 344) accordingly. This information is conveyed to rename-1 unit along with the current speculative top of stack 352 and on result bus 346.

Figure 3:
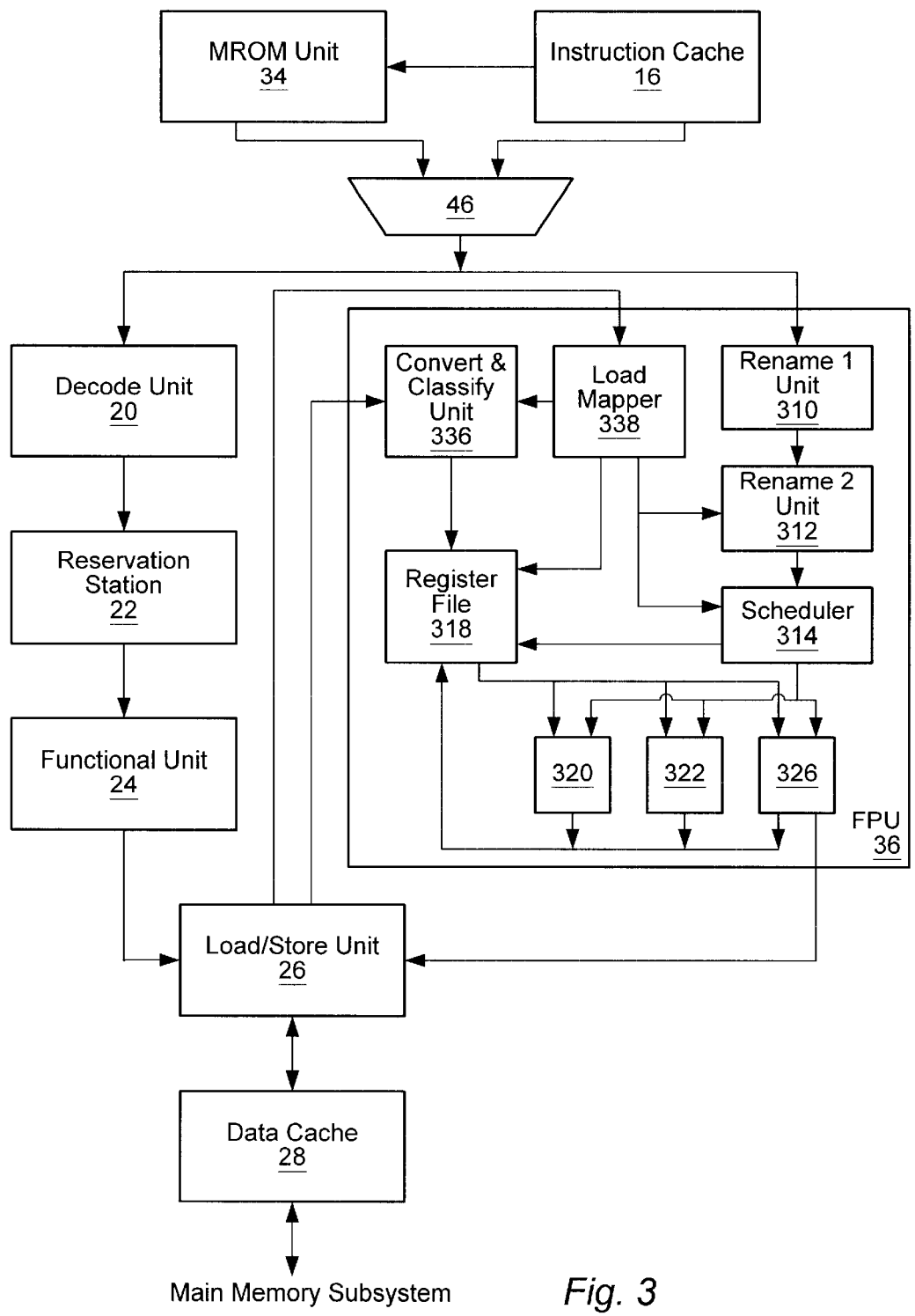
FIG. 3 is a block diagram depicting portions of one embodiment of the exemplary microprocessor of FIG. 1.

Turning now to FIG. 3, a portion of the superscalar microprocessor of FIG. 1 is shown. FIG. 3 depicts MROM unit 34, instruction cache 16, multiplexer 46, decode unit 20, reservation station 22, functional unit 24, FPU 36, load/store unit 26, and data cache 28. As indicated in FIG. 3, instruction cache 16 is coupled to MROM unit 34 and multiplexer 46. MROM unit 34 is coupled to multiplexer 46. Multiplexer 46 is coupled to decode unit 20 and FPU 36. FPU 36 is coupled to load/store unit 26. Decode unit 20 is coupled to reservation station 22. Reservation station 22 is coupled to functional unit 24. Functional unit 24 is coupled to load/ store unit 26. Load/store unit 26 is coupled to data cache 28. Data cache 28 is coupled to a main memory subsystem (not shown). In addition, FPU 36 includes convert and classify unit 336, load mapper 338, register file 318, rename 1 unit 310, rename unit 312, scheduler 314, load/add execution pipeline 320, load/multiply execution pipeline 322, and load/store execution pipeline 326. Rename 1 unit 310 is coupled to rename 2 unit 312. Rename unit 312 is coupled to scheduler 314. Scheduler 314 is coupled to register file 318, load/add execution pipeline 320, load/multiply execution pipeline 322, and load/store execution pipeline 326. Load/add execution pipeline 320, load/multiply execution pipeline 322, and load/store execution pipeline 326 are coupled to register file 318. Load/store execution pipeline 326 is coupled to load/store unit 26. Convert and classify unit 336 is coupled to register file 318 and load mapper 338. Load mapper 338 is coupled to register file 318, rename 2 unit 312, and scheduler 314.

FPU 36 can be configured to receive instructions from MROM unit 34 and instruction cache 16. FIG. 3 depicts multiplexer 46 selecting instructions from MROM unit 34 and instruction cache 16 to convey to FPU 36. In one embodiment, such as the one shown in FIG. 1, MROM unit 34 and instruction cache 16 are configured to convey up to three instructions per clock cycle through a set of multiplexers 46A, 46B, and 46C. Other embodiments may convey other numbers of instructions to FPU 36 per clock cycle. Instructions from instruction cache 16 may also pass through an instruction alignment unit or early decode unit as shown in FIG. 1 prior to being conveyed to FPU 36.

FPU 36 is configured to receive and execute floating-point instructions. These floating-point instructions include load instructions. Load instructions are instructions that are configured to cause a data value from a memory to be loaded into FPU 36. Load instructions may load a data value from a main memory, a data cache such as data cache 28, or a storage in load/store unit 26. In the embodiment of FIG. 3, load instructions can be configured to specify an address as a source operand and copy the data value found at that address to a destination operand.

In the embodiment of FIG. 3, the address of floating-point load instructions can be calculated in functional unit 24. The address can then be conveyed to load/store unit 26 which, in turn, can convey load data corresponding to the address to FPU 36. In this embodiment, a load instruction can be configured as a microcode instruction. Microcode instructions include one or more microinstructions. In this embodiment, MROM unit 34 can convey a microinstruction corresponding to the load instruction to decode unit 20 for execution in functional unit 24 to generate the address of the load instruction. Other embodiments may calculate the address of load instructions in other functional units or in a dedicated address generation unit (not shown). Also, other embodiments may configure load instructions as directly decodable or non-microcode instructions.

MROM unit 34 can also convey a microinstruction corresponding to the load instruction to FPU 36 for completion and exception purposes. This microinstruction can be referred to as the load instruction or the floating-point load instruction. The load instruction conveyed to FPU 36 can be received by rename 1 unit 310. Rename 1 unit 310 can be configured to assign an absolute register number to the destination operand of the load instruction and convey the load instruction to rename 2 unit 312. Rename 2 unit 312 can be configured to assign a destination register tag to the absolute register number corresponding to the destination operand of the load instruction. The load instruction can be configured to cause load data to be written to a register specified by the destination register tag. Rename 2 unit 312 can be configured to convey the load instruction to scheduler 314.

Scheduler 314 can be configured to schedule the load instruction according to the criteria described above in FIG. 2. This criteria can include the availability of the execution pipeline for the load instruction, the availability of the result bus for the load instruction, and the availability of the load data. Assuming that an execution pipeline and a result bus for that pipeline are free, scheduler 314 can be configured to schedule the load instruction in response to the load data or a load tag corresponding to the load instruction being conveyed by load/store unit 26.

In one embodiment, load instructions and other instructions can be tracked internally using a reorder buffer tag assigned to each instruction by a reorder buffer such as reorder buffer 32 in FIG. 1. Load/store unit 26 can be configured to track floating-point load instructions using the reorder buffer tag assigned to each instruction. Loads/store unit 26 can be configured to receive a load address and the reorder buffer tag corresponding to a load instruction. Load/ store unit 26 can be configured to obtain load data corresponding to the load instruction from either data cache 28 or a main memory subsystem (not shown).

In response to retrieving load data corresponding to the load instruction, load/store unit 26 can be configured to convey the reorder buffer tag and the load data to FPU 36. The reorder buffer tag can also be referred to as the load tag for that instruction. The use of other types of load tags, such as an address or register tag corresponding to the load instruction, is possible and contemplated. In one embodiment, load data can also be conveyed to FPU 36 from data cache 28 or main memory (not shown).

In one embodiment, load/store unit 26 can be configured to convey load data corresponding to two load instructions to FPU 36 per clock cycle. Other embodiments may be configured to convey load data corresponding to other numbers of load instructions per clock cycle.

In one embodiment, load/store unit 26 can be configured to convey the load tag prior to conveying the load data. In one particular embodiment, load/store unit 26 can be configured to convey the load data in a clock cycle immediately following the clock cycle in which it conveys the reorder buffer tag. Other embodiments can convey the load tag and load data according to other timing schemes.

FPU 36 can be configured to receive a load tag and load data corresponding to a load instruction. In the embodiment of FIG. 3, the load tag can be received in load mapper 338. Load mapper 338 can be configured to translate the load tag into a destination register tag corresponding to the load instruction. Load mapper 338 can be configured to convey a load signal corresponding to the load instruction to rename unit 312 and scheduler 314. In one embodiment, the load signal can comprise the destination register tag corresponding to the load instruction. Load mapper 338 can also be configured to convey conversion information to convert and classify unit 336 and the destination register tag to register file 318.

In the embodiment of FIG. 3, convert and classify unit 336 can be configured to receive the load data from load/store unit 26, classify it by its data type, and convert it to an internal format using the conversion information received from load mapper 338. Convert and classify unit 336 can also be configured to write the load data into a register in register file 318. Register file 318 can be configured to index the register to write the load data using the destination register tag received from load mapper 338. In an alternative embodiment, FPU 36 can be configured to write the load data directly into a register in register file 318 without providing the load data to convert and classify unit 336.

Scheduler 314 can be configured to schedule the load instruction in response to receiving the load signal from load mapper 338. Scheduler 314 can then be configured to issue the load instruction to either load/add execution pipeline 320, load/multiply execution pipeline 322, or load/store execution pipeline 326 as determined in rename 1 unit 310. The execution pipeline that receives the load instruction can be configured to generate a completion signal and exception information. The completion signal and exception information can be conveyed to execution and pipeline control unit 340. Any exceptions generated by the load instruction can be handled in response to the load instruction being retired.

FPU 36 is also configured to receive and execute instructions subsequent to the load instruction. At times, a subsequent instruction may specify a source operand that corresponds to the destination operand of the load instruction. In the embodiment of FIG. 3, the source operand of the subsequent instruction corresponds to the destination operand of the load instruction if the source register tag assigned to the source operand is the same as the destination register tag assigned to the destination operand of the load instruction. In other embodiments, the source operand of the subsequent instruction may correspond to the destination operand of the load instruction in other ways.

In the embodiment of FIG. 3, scheduler 314 can be configured to scheduler instructions once the source operands specified by the instructions are ready. Where the source operand of an instruction subsequent to a load instruction corresponds to the destination operand of the load instruction, the source operand of the subsequent instruction may not be ready until FPU 36 receives the load data corresponding to the load instruction. Consequently, the subsequent instruction cannot be scheduled until scheduler 314 knows when the load data corresponding to the load instruction will be received by FPU 36.

FPU 36 can be configured to execute different types of load instructions. Certain load instructions require one or more execution steps to be performed on the load data after it is received by FPU 36. These load instructions can be referred to as complex load instructions. Other load instructions do not require additional processing steps to be performed on the load data except in some rare exceptional cases. These load instructions can be referred to as simple load instructions. In one particular embodiment configured to execute x87 or x86 instructions, simple load instructions can include MOVQ, MOVD, FLD (qword), and FLD (dword).

In the embodiment of FIG. 3, load data for both complex and simple load instructions can be converted to an internal data format by convert and classify unit 336 prior to being written to a register in register file 318. For complex load instructions, the load data can be further operated on by one of the execution pipelines 320, 322, or 326 according to the complex load instruction. The load data for complex load instructions is not available for use by a subsequent instruction until after it has been operated on by one of the execution pipelines.

For simple load instructions, the load data does not need to be operated on by an execution pipeline. As a result, load data can be available for use by a subsequent instruction once it has been converted to the internal format of FPU 36 by convert and classify unit 336. In one embodiment, the load data for simple load instructions becomes available once it is written to a register in register file 318. In an alternative embodiment, the load data for simple load instructions becomes available prior to being written to a register in register file 318.

If a source operand of an instruction subsequent to a load instruction corresponds to the destination operand of the load instruction, then load data corresponding to the destination operand can be superforwarded as the source operand of the subsequent instruction if the load instruction is a simple load instruction. The term superforwarding refers to the practice of making the destination operand of a simple load instruction available as a source operand of a subsequent instruction as soon as the destination operand becomes available prior to the simple load instruction being scheduled or executed.

In the embodiment of FIG. 3, load mapper 338 can be configured to convey a load signal corresponding to a simple load instruction to scheduler 314 and rename 2 unit 312 to indicate when the load data of that instruction will become available. In response to receiving the load signal, scheduler 314 can be configured to schedule the simple load instruction and the subsequent instruction consistent with any other scheduling criteria. As a result, the subsequent instruction can be scheduled and executed prior to, at the same time as, or after the simple load instruction. The subsequent instruction can receive the load data of the simple load instruction before, during, or after the simple load instruction being scheduled or executed. Broadly speaking, an instruction that depends on a simple load instruction can be scheduled and executed independently of the simple load instruction.

For example, if a simple load instruction and a subsequent instruction that specifies a source operand that corresponds to the destination operand of the simple load instruction are in scheduler 314, scheduler 314 can schedule each instruction when the load data, the execution pipeline, and the result bus for each instruction becomes available. If the execution pipeline and result bus for the subsequent instruction are available when scheduler 314 receives the load signal from load mapper 338 indicating that the load data is available, then the subsequent instruction can be immediately scheduled and conveyed from scheduler 314 to an execution pipeline for execution regardless of the status of the simple load instruction.

In one embodiment, execution pipelines 320, 322, and 326 can be configured to detect certain exception conditions for both simple and complex load instructions. If an exception condition is detected for a simple load instruction, FPU 36 can be configured to execute an abort routine upon retiring the simple load instruction to prevent data from being improperly superforwarded to a subsequent instruction. In one particular embodiment, execution pipelines 320, 322, and 326 can be configured to generate an exception condition in response to detecting a signaling NaN for a simple load instruction. In this embodiment, execution pipelines can be configured to convert a signaling NaN to a quiet NaN. In this particular embodiment, the detection of a signaling NaN for a simple load instruction exception information that will result in an abort when the simple load instruction is retired.

Figure 4:
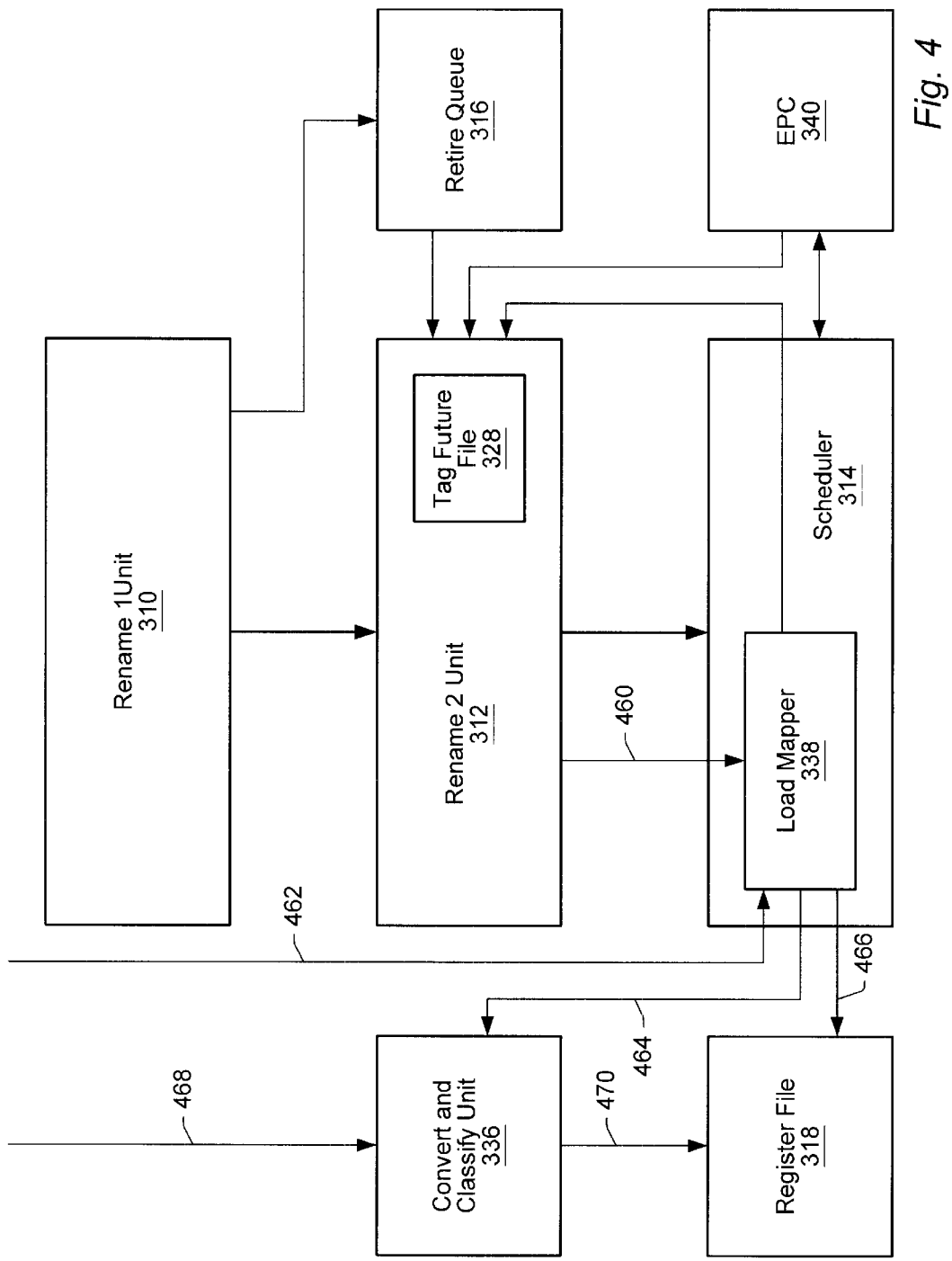
FIG. 4 is a block diagram depicting portions of one embodiment of the floating-point unit of FIG. 2.

Turning now to FIG. 4, a block diagram depicting portions of one embodiment of the floating-point unit of FIG. 2 is shown. FIG. 4 depicts rename 1 unit 310, rename 2 unit 312, scheduler 314, register file 318, convert and classify unit 336, execution and pipeline control 340, and retire queue 316. In the embodiment of FIG. 4, rename 2 unit 312 includes tag future file 328 and scheduler 314 includes load mapper 338. As indicated in FIG. 4, rename 1 unit 310 is coupled to rename 2 unit 312 and retire queue 316. Rename 2 unit 312 is coupled to scheduler 314, load mapper 338, retire queue 316, and execution and pipeline control 340. Scheduler 314 and load mapper 338 are coupled to register file 318 and convert and classify unit 336. Scheduler 314 is also coupled to execution and pipeline control 340. Register file 318 is coupled to convert and classify unit 336. Load mapper 338 is coupled to a load tag bus. Convert and classify unit 336 is coupled to a load data bus 468. It can be noted that other types of execution units may employ similar configurations.

In the embodiment of FIG. 4, load data corresponding to a simple load instruction can be superforwarded as a source operand of a subsequent instruction. Superforwarding will now be described in the embodiment of FIG. 4.

Rename 1 unit 310 can be configured to receive floating-point instructions and corresponding reorder buffer tags. Rename 1 unit 310 can be configured to assign an absolute register number corresponding to an architectural or microcode register to each source and destination operand of the instructions. Rename 1 unit 310 can be configured to generate a memory op signal and a simple load signal for each instruction. Rename 1 unit 310 can be configured to set the memory op signal for each instruction with a memory source operand—including load instructions. Rename 1 unit 310 can be configured to set the simple load signal for each load instruction that corresponds to a simple load instruction as described above in FIG. 3. Rename 1 unit 310 can be configured to convey the reorder buffer tag, the memory op signal and the simple load signal for each instruction to rename 2 unit 312.

Rename 1 unit 310 can also be configured to convey a valid instruction signal or signals to retire queue 316 to indicate that it has received one or more valid instructions. In response to receiving the valid signal or signals, retire queue 316 can be configured to convey a destination register tag from a free list to rename 2 unit 312 for each valid signal. In one embodiment, retire queue 316 can be configured to convey three destination register tags from the free list to be assigned to up to three valid instructions in rename 2 unit 312 in response to receiving a valid signal.

Rename 2 unit 312 can be configured to receive instructions along with a memory op signal and a simple load signal for each instruction from rename 1 unit 310. Rename 2 unit 312 can also be configured to receive destination register tags from retire queue 316 and assign a destination register tag to the destination operand of each instruction. In the embodiment of FIG. 4, rename 2 unit includes tag future file 328. Tag future file 328 can be configured to store a speculative destination register tag for each architectural and microcode register in FPU 36. Tag future file 318 can be configured to store a destination register tag using an absolute register number to index each architectural and microcode register. Rename 2 unit 312 can be configured to store the destination register tag assigned to each valid instruction into tag future file 328 according to the absolute register number of the destination operand. If the memory op signal and the simple load signal are set for an instruction, a superforward bit in tag future file 328 can be set when the destination register tag for that instruction are written to tag future file 328. If either the memory op signal or the simple load signal is not set for an instruction, then rename 2 unit 312 can be configured to reset the superforward bit in tag future file 328 corresponding to the destination operand for that instruction. Tag future file 328 can also be configured to store a ready bit corresponding to each absolute register number. In one embodiment, the ready bit can be set to indicate that the value corresponding to the destination register tag has been written to register file 318. Thus, the value can be read from register file 318 and does not need to be snooped from either a load bus or a result bus.

Rename 2 unit 312 can be configured to read the source register tags for each source operand of an instruction from tag future file 328 using the absolute register number of each source operand that was assigned in rename 1 unit 310. Rename 2 unit 312 can also be configured to read the superforward bit and ready bit for each source operand. Rename 2 unit 312 can be configured to convey instructions and their operand tags to scheduler 314. Rename 2 unit 312 can also be configured to convey the superforward bit and the ready bit for each source operand of the instructions to scheduler 314.

Scheduler 314 can be configured to receive instructions as well as the operand tags, the superforward bits, and the ready bits for each instruction. Scheduler 314 can be configured to examine the superforward bit and the ready bit of each source operand to determine whether the source operand can be superforwarded. In one embodiment, a source operand can be superforwarded if the superforward bit corresponding to that source operand is set and the ready bit is reset. If the source operand can be superforwarded, scheduler 314 can be configured to schedule the instruction corresponding to the source operand in response to the source operand becoming available. In this embodiment, scheduler 314 can be configured to read the source operand from a result bus if the superforward bit and ready bit corresponding to that source operand are reset. If the ready bit for that source operand is set, scheduler 314 can also be configured to read the source operand from register file 318. Other embodiments can be configured to superforward source operands based on other values of the superforward and/or ready bits.

In response to detecting a load instruction, rename 2 unit 312 can be configured to convey a reorder buffer tag corresponding to the load instruction, a destination register tag assigned to the load instruction, and conversion information to load mapper 338 via signals 460. Load mapper 338 can be configured to receive the reorder buffer tag, the destination register tag, and the conversion information from rename unit 312. Load mapper 338 can also be configured to store the destination register tag and conversion information in a location indexed by the reorder buffer tag.

Load mapper 338 can be configured to receive a load tag signal 462 corresponding to a load instruction from load/store unit 26 (shown in FIG. 3). In one embodiment, a load tag signal can comprise the reorder buffer tag corresponding to the load instruction. Other embodiments can be configured to employ other types of load tag signals. In response to receiving a load tag signal, load mapper 338 can be configured to convey the conversion information to convert and classify unit 336 via signals 464 and the destination register tag to register file 318 via signals 466. In one embodiment, load mapper 338 can be configured to convey the conversion information and destination register tag corresponding to the reorder buffer tag for the load instruction.

Convert and classify unit 336 can be configured to receive load data corresponding to the load instruction from load/store unit 26 (shown in FIG. 3) via bus 468. Convert and classify unit 336 can be configured to convert the load data to an internal format using the conversion information and can be configured to convey the converted load data to register file 318 via bus 470. Register file 318 can be configured to store the converted load data using the destination register tag conveyed from load mapper 338. In an alternative embodiment, load data can be stored directly into register file 318 without converting it into an internal format.

In response to receiving a load tag signal, load mapper 338 can be configured to convey a load signal corresponding to a load instruction to scheduler 314. In response to receiving the load signal, scheduler 314 can be configured to schedule the load instruction corresponding to load signal. Scheduler 314 can be configured to schedule instructions according to the criteria discussed above in FIG. 2. Scheduler 314 can be configured to convey the load instruction to an execution pipeline for exception and completion purposes as discussed above.

In one embodiment, the load signal comprises the destination register tag of the load instruction. Scheduler 314 can be configured to compare the load signal to the source register tag of other instructions in scheduler 314. If a source register tag of an instruction matches the load signal and the superforward bit corresponding to the source register tag is set, scheduler 314 can be configured to superforward the load data as the source operand of that instruction. Consequently, scheduler 314 can be configured to schedule that instruction as soon as the other scheduling criteria are met. Scheduler 314 can be configured to schedule that instruction before, after, or at the same time as the load instruction that corresponds to the load data depending on when the load instruction meets the scheduling criteria.

In one embodiment, scheduler 314 can be configured to read superforwarded load data from a register in register file 318. In one particular embodiment, scheduler 314 can be configured to read the load data as a source operand in the same clock cycle that the load data is written to a register in register file 318. In an alternative embodiment, scheduler 314 can be configured to read the load data as a source operand from a load port using a load bypass. These embodiments are further described in FIG. 6A and FIG. 6B below.

In one embodiment, convert and classify unit 336 can be configured to detect and convert denormal load data. Denormal load data may take an additional clock cycle to convert to non-denormal load data. In this embodiment, convert and classify unit can be configured to convey an invalidate signal to scheduler 314 to indicate that denormal load data has been detected. Scheduler 314 can be configured to invalidate the scheduled load instruction corresponding to the load data as well as any subsequent instructions that superforward the load data. Scheduler 314 can reschedule the load instruction and any subsequent instructions in a subsequent clock cycle.

Load mapper 338 can also be configured to convey the load signal to tag future file 328. In response to receiving a load signal, tag future file 328 can be configured to set the ready bit corresponding to absolute register number used as the destination operand of the load instruction. Tag future file 328 can also be configured to reset the superforward bit corresponding to the absolute register number used as the destination operand of the load instruction.

Figure 5:
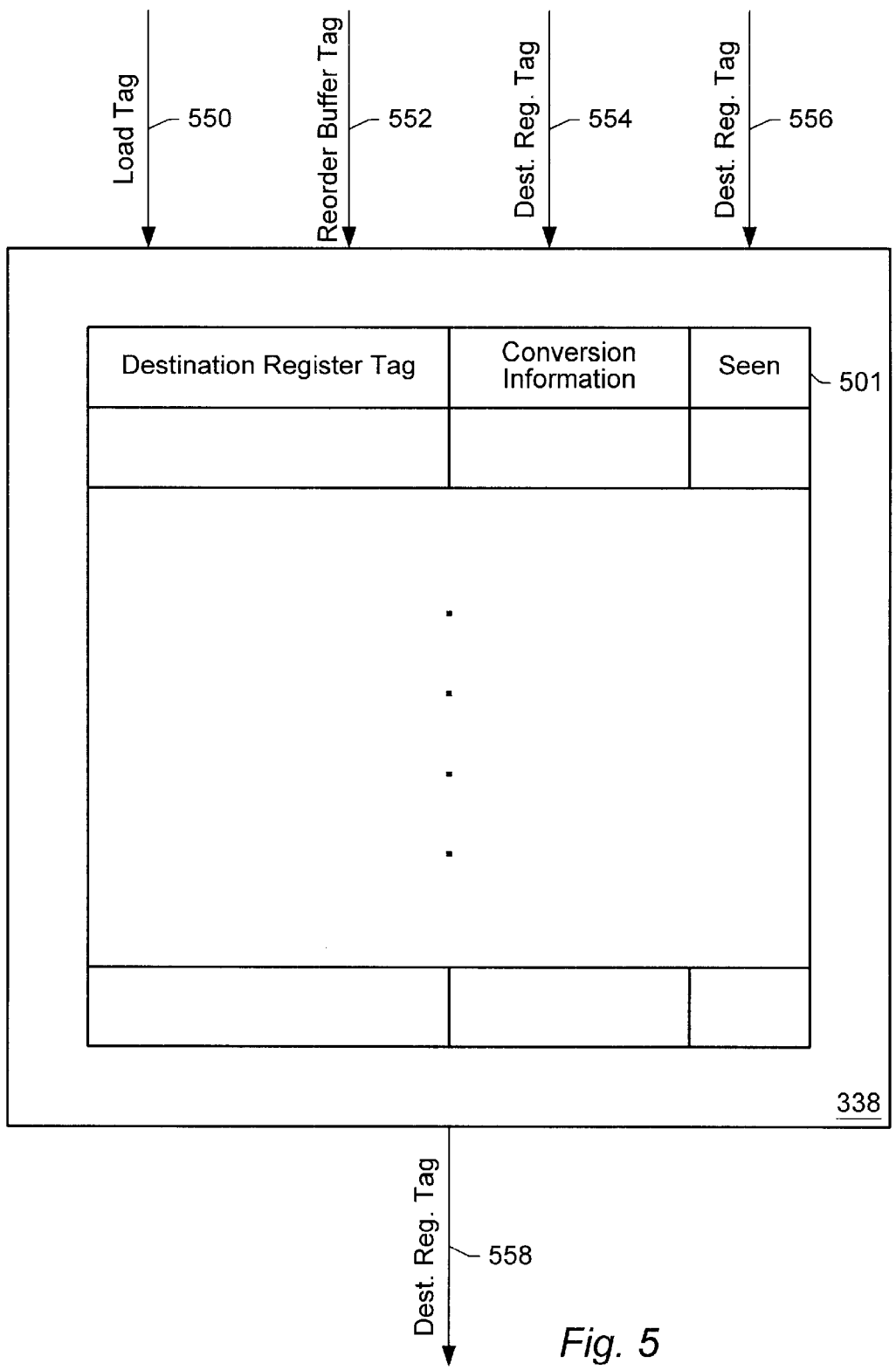
FIG. 5 is a block diagram of one embodiment of a load mapper.

Turning now to FIG. 5, a block diagram of one embodiment of a load mapper is shown. Other embodiments are possible and contemplated. FIG. 5 depicts one embodiment of load mapper 338 of FIG. 2. As shown, load mapper 338 includes a plurality of entries 501. Each entry includes a destination register tag, conversion information, and a seen bit. In one embodiment, the destination register tag comprises seven bits, the conversion information comprises three bits, and the seen bit comprises one bit. Load mapper 338 can be configured to index the plurality of entries 501 using a load tag. In one embodiment, the load tag corresponds to a reorder buffer tag assigned by a reorder buffer. In one particular embodiment, load mapper 338 can be configured to include three entries for each line in a reorder buffer.

Load mapper 338 can be configured to receive information for up to three entries per clock cycle. In one embodiment, a destination register tag and conversion information can be conveyed to load mapper 338 for up to three instructions along with a reorder buffer tag that corresponds to the three instructions. The destination register tags can be conveyed on destination register tag buses 554 and the conversion information can be conveyed in conversion information bus 556. The destination register tags and conversion information may originate from rename 2 unit 312 as shown in FIG. 4. Other embodiments can be configured to convey other information or other numbers of entries per clock cycle to load mapper 338. In the embodiment of FIG. 5, the destination register tag or tags and the conversion information can be stored in a set of entries indexed by the reorder buffer tag. A reorder buffer tag can be conveyed on reorder buffer tag bus 552.

The destination register tag can be used to identify a physical register in a register file such as register file 318. In response to receiving a load tag from a load/store unit such as load/store unit 26 in FIG. 3, load mapper 338 can be configured to convey the destination register tag corresponding to the load tag to a register file such as register file 318 in FIG. 4 via destination register tag bus 558. The destination register tag can also be conveyed to a scheduler such as scheduler 314 in FIG. 4 via destination register tag bus 558. Load mapper can also be configured to convey the conversion information to a conversion unit such as convert and classify unit 336 in FIG. 4. In one embodiment, load mapper 338 can be configured to receive up to two load tags per clock cycle on load tag bus 550 and convey the information in the entries corresponding to the two load tags as just described. Other embodiments can be configured to receive other numbers of load tags per clock cycle.

The seen bit in an entry can be set in response to receiving a load tag corresponding to that entry. In one embodiment, the seen bit can be used to mark entries that have already been translated by load mapper 338, i.e. a load tag corresponding to the entry has been received via load tag 550. In this embodiment, the seen bit can be read in response to receiving a corresponding load tag. If the seen bit is set, the load corresponding to the load tag can be considered to be a repeat of a previous load and can be invalidated.

Figure 6A:
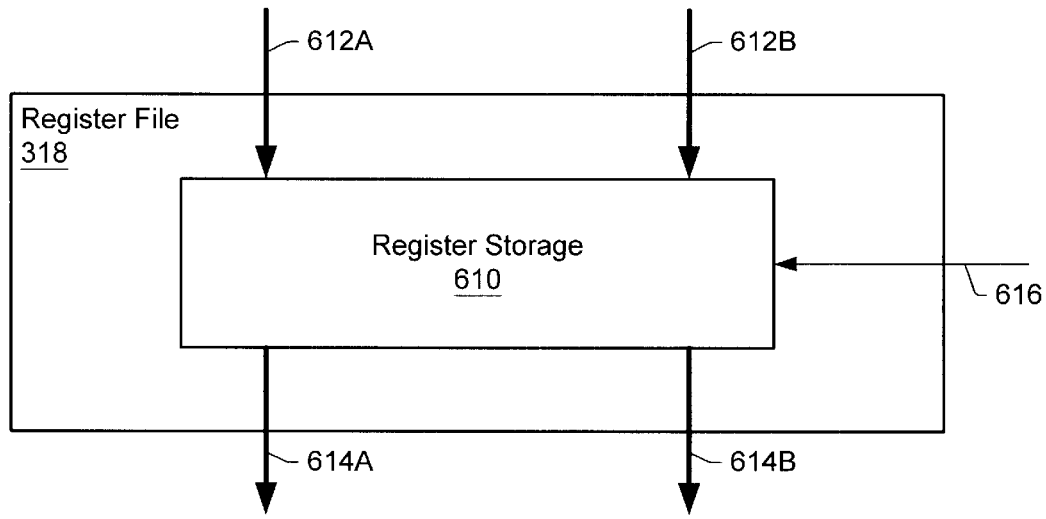
FIG. 6A is a block diagram of one embodiment of a register file.

Turning now to FIG. 6A, a block diagram of one embodiment of a register file is shown. FIG. 6A depicts one embodiment of register file 318 including register storage 610. Register storage 610 is coupled to write ports 612A and 612B, read ports 614A and 614B, and register tags 616.

Register file 318 is configured to receive load data corresponding to load instructions. Register storage 610 includes a plurality of registers and may include a tag to store information associated with each register. Register file 318 is configured to receive load data on write ports 612A and 612B. Other embodiments may employ different numbers of write ports. Register file 318 is also configured to receive register tags 616. Register tags 616 may be configured to transmit two register tags per clock cycle. Register file 318 is configured to write load data to a register in register storage 610. Register file 318 is also configured to provide register reads on read ports 614A and 614B. Other embodiments may employ other numbers of read ports.

Register file 318 can be configured to superforward load data. Register file 318 can be configured to write load data corresponding to a simple load instruction to a register in register storage 610 and subsequently read the load data from the same register in register storage 610. In one embodiment, a register may be written to and read from during the same clock cycle. Other embodiments may perform superforwarding in other numbers of clock cycles or fractions thereof.

Figure 6B:
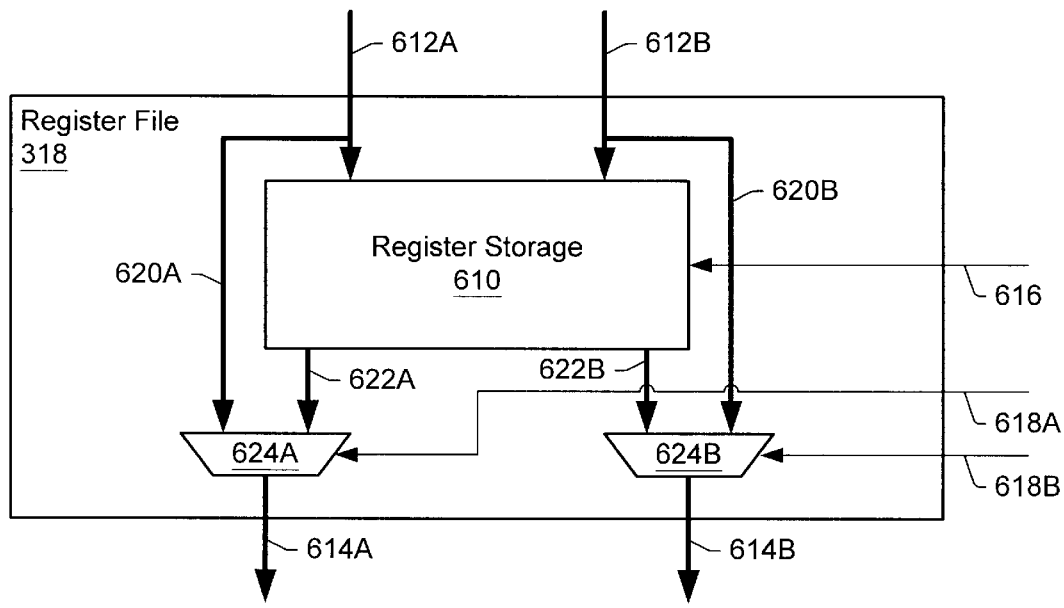
FIG. 6B is a block diagram of an alternative embodiment of a register file.

Turning now to FIG. 6B, a block diagram of an alternative embodiment of a register file is shown. FIG. 6B depicts an alternative embodiment of register file 318 including register storage 610 and multiplexers 624A and 624B. Register file bypass buses 620A and 620B are also shown. Register storage 610 is coupled to write ports 612A and 612B, register storage outputs 622A and 622B, multiplexers 624A and 624B, read ports 614A and 614B, and load tags 616. Multiplexers 624A and 624B are coupled to selector signals 618A and 618B, respectively. Register file bypass buses 620A and 620B are also shown.

Register file 318 is configured to receive load data corresponding to load instructions. Register storage 610 includes a plurality of registers and may include a tag to store information associated with each register. Register file 318 is configured to receive load data on write ports 612A and 612B. Other embodiments may employ different numbers of write ports. Register file 318 is also configured to receive register tags 616 and selector signals 618A and 618B. Register tags 616 may be configured to transmit two register tags per clock cycle. Register file 318 is configured to write load data to a register in register storage 610. Register file 318 is also configured to provide register reads on read ports 614A and 614B. Other embodiments may employ other numbers of read ports. Register file is also configured to provide load data on register file bypass buses 620A and 620B. Register file bypass buses 620A and 620B and register storage outputs 622A and 622B are shown as inputs to multiplexers 624A and 624B. Multiplexer 624A is configured to select either register file bus 620A or register storage output 622A to couple to read port 614A based on selector signal 618A. Multiplexer 624B is configured to select either register file bus 620B or register storage output 622B to couple to read port 614B based on selector signal 618B. Other embodiments may employ other numbers of multiplexers based on the number of read ports or register file bypass buses.

Register file 318 can be configured to superforward load data. Register file 318 can be configured to write load data corresponding to a simple load instruction to a register in register storage 610 and provide the write operand on a register file bypass bus 620A or 620B. Multiplexer 624A or 624B can select register file bypass bus 620A or 620B to provide on read port 614A or 614B. In one embodiment, the load data may be provided on read port 614A or 614B during the same clock cycle that the load data is written to a register in register storage 610. Other embodiments may perform superforwarding in other numbers of clock cycles or fractions thereof. Selectors 518A and 518B may be configured to signal register storage 510 to superforward an operand.

FIGS. 7A–7D illustrate exemplary timing diagrams for a simple load instruction and an instruction subsequent to the simple load instruction that depends on the simple load instruction. The pipeline stages for FIGS. 7A–7D are abbreviated as follows: rename 1=RN1, rename 2=RN2, scheduler write=SW, schedule=S, register file read=RF, and execute=EX. The numbers in the top row of FIGS. 7A–7D indicate the clock cycle. The pipeline stage for the instructions in a particular clock cycle is read from the column for that clock cycle.

Turning now to FIG. 7A, chart 710 illustrates a first exemplary timing diagram for instructions in a floating-point execution unit pipeline. In the chart of FIG. 7A, the simple load instruction and the subsequent instruction are conveyed to rename 1 in clock cycle 0. The instructions are conveyed to rename 2, scheduler write and schedule in clock cycles 1, 2 and 3, respectively. In the chart of FIG. 7A, the simple load instruction and the subsequent instruction remain in the scheduler during clock cycles 3, 4, and 5 to await the arrival of the load data. Other embodiments may be configured to schedule the instructions in other numbers of clock cycles. As shown in FIG. 7A, the load tags for the simple load instruction arrive in clock cycle 4. As a result, the simple load instruction and the subsequent instruction are both scheduled for execution in clock cycle 5. The instructions may be scheduled consistent with the conditions for scheduling instructions detailed in the description above for FIG. 2. The destination operand of the simple load instruction can be superforwarded to the subsequent instruction during clock cycle 6 as described above. The simple load instruction and the subsequent instruction are conveyed to register file read in clock cycle 6 and execute in clock cycle 7.

Turning now to FIG. 7B, chart 720 demonstrates how the subsequent instruction that depends on the simple load instruction can be scheduled and executed prior to the simple load instruction. FIG. 7B resembles FIG. 7A until clock cycle 6. In clock cycle 5, the subsequent instruction meets all of the scheduling criteria and is scheduled. The simple load instruction, however, does not meet all of the scheduling criteria and is not scheduled until clock cycle 6. In clock cycle 6, the subsequent instruction proceeds to register file read. In clock cycle 7, the subsequent instruction proceeds to execute while the simple load instruction proceeds to register file read.

Turning now to FIG. 7C, chart 730 demonstrates how the subsequent instruction can be scheduled during the same clock cycle as the simple load instruction despite arriving in rename 1 in a clock cycle after the simple load instruction. As can be seen in FIG. 7C, the subsequent instruction arrives in the schedule stage in clock cycle 4 while the simple load instruction waits to be scheduled. Since both instructions meet the scheduling criteria in clock cycle 5, the can both be scheduled and conveyed to register file read and execute in clock cycles 6 and 7, respectively.

Turning now to FIG. 7D, chart 740 demonstrates how a subsequent instruction can be notified to receive superforwarded load data in rename 2. In FIG. 7D, the simple load instruction proceeds through the pipeline stages as in FIGS. 7A and 7C. The subsequent instruction is not received in rename 1 until clock cycle 4. In clock cycle 5, the subsequent instruction can be informed in rename 2 that one of its source operands needs to be superforwarded as described above in FIG. 4. Consequently, the subsequent instruction can proceed to scheduler write and schedule in clock cycles 6 and 7, respectively. Assuming the scheduling criteria are met in clock cycle 7, the subsequent instruction can proceed to register file read and execute in clock cycles 8 and 9, respectively (not shown).

Figure 8A:
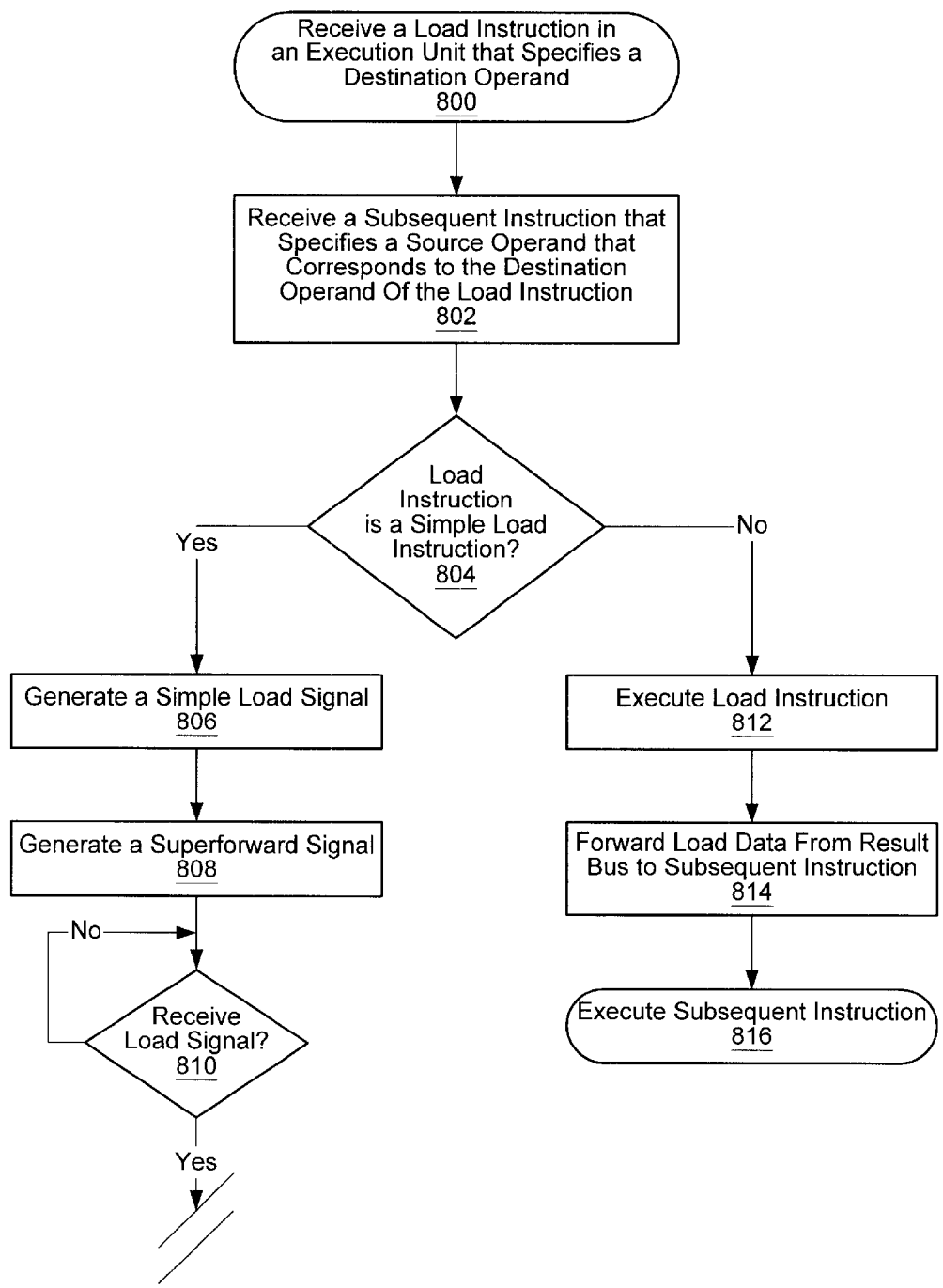
FIG. 8A is a first portion of a chart depicting a method for superforwarding load data.
Figure 8B:
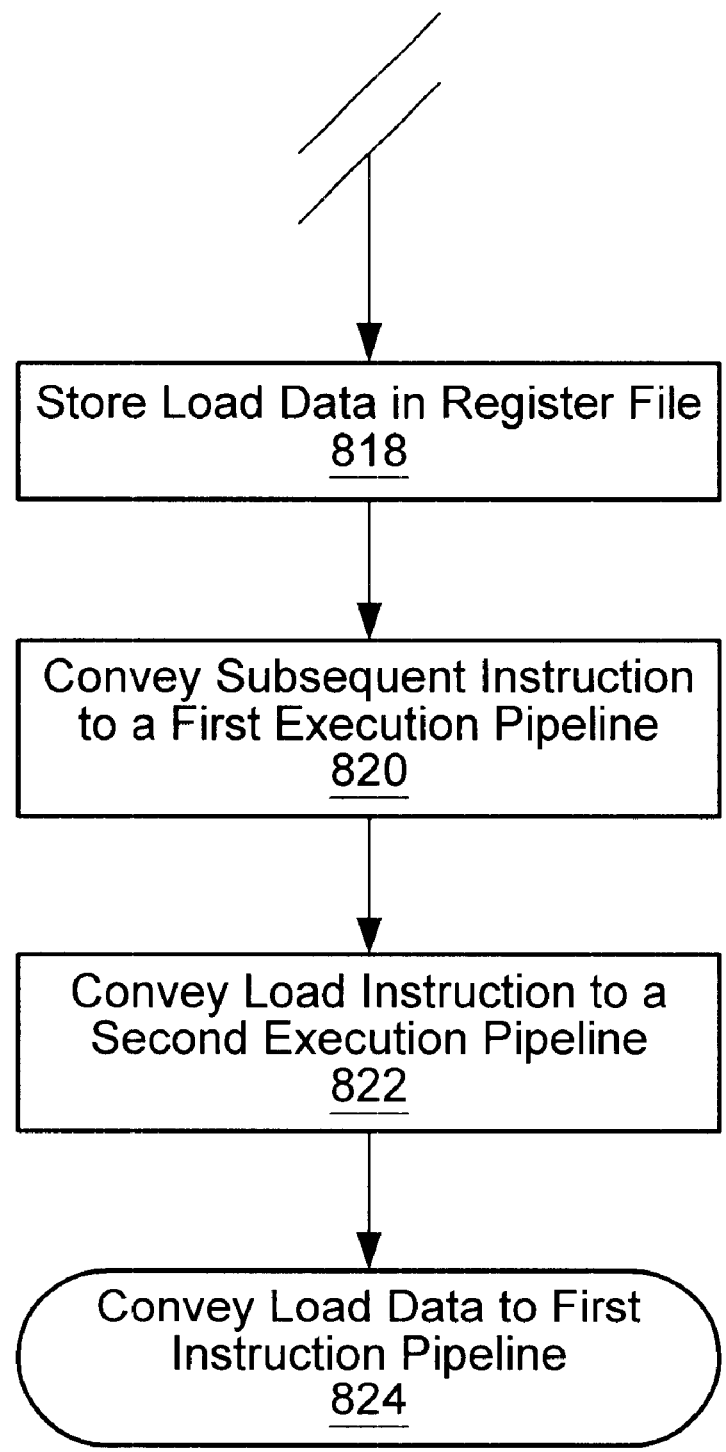
FIG. 8B is a second portion of a chart depicting a method for superforwarding load data.

Turning now to FIG. 8, a chart depicting a method for superforwarding load data is shown. Variations of the method shown are possible and contemplated. It can be noted that the method depicted may be implemented in a floating-point execution unit or other types of execution units. As shown in FIG. 8, block 800 indicates receiving a load instruction that specifies a destination operand. Block 802 indicates receiving a subsequent instruction that specifies a source operand that corresponds to the destination operand of the load instruction.

In block 804, a determination is made as to whether the load instruction is a simple load instruction. If the load instruction is a simple load instruction, a simple load signal corresponding to the load instruction can be generated as indicated in block 806. Block 808 indicates generating a superforward signal for the source operand of the subsequent instruction.

If the load instruction is not a simple load instruction, the load instruction can be executed as indicated in block 812. Block 814 indicates forwarding load data from a result bus to the subsequent instruction. Since the load instruction is not a simple load instruction, the load instruction is configured to operate on the load data in an execution pipeline. Consequently, the subsequent instruction cannot be scheduled for execution until the load instruction completes and conveys data corresponding to the source operand of the subsequent instruction on a result bus of the execution pipeline. Once the source operand becomes available, the subsequent instruction can be executed as indicated in block 816.

Continuing in block 810, a determination is made as to whether a load signal corresponding to the load instruction has been received. Once the load signal has been received, the load data can be stored in a register file as indicated in block 818. The subsequent instruction can be conveyed to a first execution pipeline as indicated in block 820, and the load instruction can be conveyed to a second execution pipeline as indicated in block 822. In one embodiment, the subsequent instruction and the load instruction can be conveyed in response to meeting scheduling criteria other than the availability of the load data. In this embodiment, the subsequent instruction can be conveyed either before, after, or at the same time as the load instruction. Block 824 indicates conveying the load data to first instruction pipeline. The first instruction pipeline can be configured to receive the load data as a source operand of the subsequent instruction.

Figure 9:
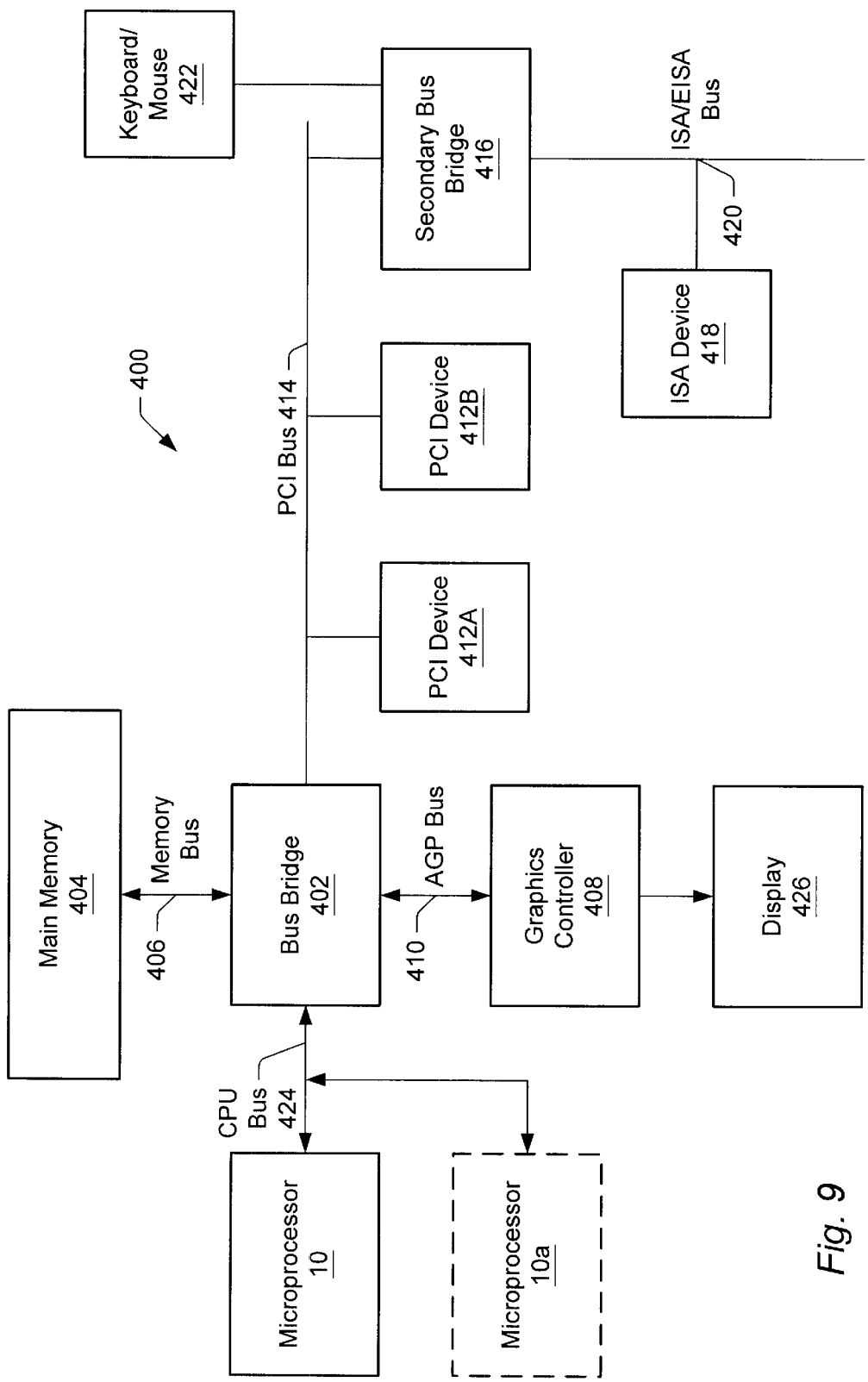
FIG. 9 is a block diagram of one embodiment of a computer system configured to utilize the microprocessor of FIG. 1.

Turning now to FIG. 9, a block diagram of one embodiment of a computer system 400 including microprocessor 10 is shown. Microprocessor 10 is coupled to a variety of system components through a bus bridge 402. Other embodiments are possible and contemplated. In the depicted system, a main memory 404 is coupled to bus bridge 402 through a memory bus 406, and a graphics controller 408 is coupled to bus bridge 402 through an AGP bus 410. Finally, a plurality of PCI devices 412A–412B are coupled to bus bridge 402 through a PCI bus 414. A secondary bus bridge 416 may further be provided to accommodate an electrical interface to one or more EISA or ISA devices 418 through an EISA/ISA bus 420. Microprocessor 10 is coupled to bus bridge 402 through a CPU bus 424.

Bus bridge 402 provides an interface between microprocessor 10, main memory 404, graphics controller 408, and devices attached to PCI bus 414. When an operation is received from one of the devices connected to bus bridge 402, bus bridge 402 identifies the target of the operation (e.g. a particular device or, in the case of PCI bus 414, that the target is on PCI bus 414). Bus bridge 402 routes the operation to the targeted device. Bus bridge 402 generally translates an operation from the protocol used by the source device or bus to the protocol used by the target device or bus.

In addition to providing an interface to an ISA/EISA bus for PCI bus 414, secondary bus bridge 416 may further incorporate additional functionality, as desired. For example, in one embodiment, secondary bus bridge 416 includes a master PCI arbiter (not shown) for arbitrating ownership of PCI bus 414. An input/output controller (not shown), either external from or integrated with secondary bus bridge 416, may also be included within computer system 400 to provide operational support for a keyboard and mouse 422 and for various serial and parallel ports, as desired. An external cache unit (not shown) may further be coupled to CPU bus 424 between microprocessor 10 and bus bridge 402 in other embodiments. Alternatively, the external cache may be coupled to bus bridge 402 and cache control logic for the external cache may be integrated into bus bridge 402.

Main memory 404 is a memory in which application programs are stored and from which microprocessor 10 primarily executes. A suitable main memory 404 comprises DRAM (Dynamic Random Access Memory), and preferably a plurality of banks of SDRAM (Synchronous DRAM).

PCI devices 412A–412B are illustrative of a variety of peripheral devices such as, for example, network interface cards, video accelerators, audio cards, hard or floppy disk drives or drive controllers, SCSI (Small Computer Systems Interface) adapters and telephony cards. Similarly, ISA device 418 is illustrative of various types of peripheral devices, such as a modem, a sound card, and a variety of data acquisition cards such as GPIB or field bus interface cards.

Graphics controller 408 is provided to control the rendering of text and images on a display 426. Graphics controller 408 may embody a typical graphics accelerator generally known in the art to render three-dimensional data structures which can be effectively shifted into and from main memory 404. Graphics controller 408 may therefore be a master of AGP bus 410 in that it can request and receive access to a target interface within bus bridge 402 to thereby obtain access to main memory 404. A dedicated graphics bus accommodates rapid retrieval of data from main memory 404. For certain operations, graphics controller 408 may further be configured to generate PCI protocol transactions on AGP bus 410. The AGP interface of bus bridge 402 may thus include functionality to support both AGP protocol transactions as well as PCI protocol target and initiator transactions. Display 426 is any electronic display upon which an image or text can be presented. A suitable display 426 includes a cathode ray tube ("CRT"), a liquid crystal display ("LCD"), etc.

It is noted that, while the AGP, PCI, and ISA or EISA buses have been used as examples in the above description, any bus architectures may be substituted as desired. It is further noted that computer system 400 may be a multiprocessing computer system including additional microprocessors (e.g. microprocessor 10a shown as an optional component of computer system 400). Microprocessor 10a may be similar to microprocessor 10. More particularly, microprocessor 10a may be an identical copy of microprocessor 10. Microprocessor 10a may share CPU bus 424 with microprocessor 10 or may be connected to bus bridge 402 via an independent bus.

It is still further noted that the present discussion may refer to the assertion of various signals. As used herein, a signal is "asserted" if it conveys a value indicative of a particular condition. Conversely, a signal is "deasserted" if it conveys a value indicative of a lack of a particular condition. A signal may be defined to be asserted when it conveys a logical zero value or, conversely, when it conveys a logical one value. Additionally, various values have been described as being discarded in the above discussion. A value may be discarded in a number of manners, but generally involves modifying the value such that it is ignored by logic circuitry which receives the value. For example, if the value comprises a bit, the logic state of the value may be inverted to discard the value. If the value is an n-bit value, one of the n-bit encodings may indicate that the value is invalid. Setting the value to the invalid encoding causes the value to be discarded. Additionally, an n-bit value may include a valid bit indicative, when set, that the n-bit value is valid. Resetting the valid bit may comprise discarding the value. Other methods of discarding a value may be used as well.

Although the embodiments above have been described in considerable detail, other versions are possible. Numerous variations and modifications will become apparent to those skilled in the art once the above disclosure is fully appreciated. It is intended that the following claims be interpreted to embrace all such variations and modifications.

We claim:

1. An execution unit, comprising:
   a plurality of execution pipelines; and
   a scheduler coupled to said plurality of execution pipelines, wherein said scheduler is configured to:
   receive a load instruction which specifies a destination operand;
   receive a subsequent instruction which specifies a source operand that corresponds to said destination operand, wherein said subsequent instruction is subsequent in program order to said load instruction; and
   convey said subsequent instruction to a first one of said plurality of execution pipelines in response to detecting said load instruction corresponds to a simple load instruction.

2. The execution unit of claim 1, wherein said scheduler is further configured to:
   receive a load signal corresponding to said load instruction; and
   convey said load instruction to a second one of said plurality of execution pipelines in response to receiving said load signal.

3. The execution unit of claim 2, wherein said scheduler is configured to convey said subsequent instruction to said first one of said plurality of execution pipelines prior to conveying said load instruction to said plurality of execution pipelines.

4. The execution unit of claim 2, wherein said scheduler is configured to convey said subsequent instruction to said first one of said plurality of execution pipelines substantially simultaneously to conveying said load instruction to said second one of said plurality of execution pipelines.

5. The execution unit of claim 1, further comprising:
   a load mapper coupled to said scheduler, wherein said load mapper is configured to convey a load signal in response to receiving a load tag corresponding to said load instruction.

6. The execution unit of claim 1, further comprising:
   a register rename unit coupled to said scheduler, wherein said register rename unit is configured to:
   receive said load instruction and said subsequent instruction;
   convey a simple load signal to said scheduler in response to said load instruction corresponding to said simple load instruction; and
   convey a superforward signal to said scheduler in response to detecting said load instruction corresponds to said simple load instruction and said source operand corresponds to said destination operand.

7. The execution unit of claim 1, further comprising:
   a register file coupled to said plurality of execution pipelines and said scheduler, wherein said register file is configured to:
   store load data corresponding to said load instruction; and
   convey said load data to said first one of said plurality of execution pipelines in response to said scheduler conveying said subsequent instruction to said first one of said plurality of execution pipelines.

8. A method for executing instructions in a microprocessor, comprising:
   receiving a load instruction, wherein said load instruction specifies a destination operand;
   receiving a subsequent instruction, wherein said subsequent instruction specifies a source operand that corresponds to said destination operand, and wherein said subsequent instruction is subsequent in program order to said load instruction;
   conveying said subsequent instruction to a first execution pipeline in response to detecting said load instruction corresponds to a simple load instruction.

9. The method of claim 8, further comprising:
   conveying said load instruction to a second execution pipeline.

10. The method of claim 9, wherein said conveying said subsequent instruction occurs prior to said conveying said load instruction.

11. The method of claim 9, wherein said conveying said subsequent instruction occurs substantially simultaneously with said conveying said load instruction.

12. The method of claim 8, further comprising:

generating a simple load signal in response to detecting said load instruction corresponds to said simple load instruction; and generating a superforward signal in response to detecting said load instruction corresponds to said simple load instruction and said source operand corresponds to said destination operand.

13. The method of claim 8, further comprising:

storing load data corresponding to said load instruction; and conveying said load data to said first execution pipeline in response to said conveying said subsequent instruction.

14. A microprocessor, comprising:

a load/store unit; and an execution unit coupled to said load/store unit, wherein said execution unit includes:

a plurality of execution pipelines; and a scheduler coupled to said plurality of execution pipelines, wherein said scheduler is configured to:

receive a load instruction, wherein said load instruction specifies a destination operand;

receive a subsequent instruction, wherein said subsequent instruction specifies a source operand that corresponds to said destination operand;

convey said subsequent instruction to a first one of said plurality of execution pipelines in response to detecting said load instruction corresponds to a simple load instruction;

wherein said load/store unit is configured to convey a load tag and load data corresponding to said load instruction to said execution unit.

15. The microprocessor of claim 14, wherein said scheduler is configured to convey said load instruction to a second one of said plurality of execution pipelines.

16. The microprocessor of claim 15, wherein said scheduler is configured to convey said subsequent instruction to said first one of said plurality of execution pipelines prior to conveying said load instruction to said plurality of execution pipelines.

17. The microprocessor of claim 15, wherein said scheduler is configured to convey said subsequent instruction to said first one of said plurality of execution pipelines substantially simultaneously to conveying said load instruction to said second one of said plurality of execution pipelines.

18. The microprocessor of claim 14, wherein said execution unit includes a load mapper coupled to said scheduler, wherein said load mapper is configured to convey said load signal in response to receiving said load tag.

19. The microprocessor of claim 14, wherein said execution unit includes a register rename unit coupled to said scheduler, wherein said register rename unit is configured to:

receive said load instruction and said subsequent instruction;

convey a simple load signal to said scheduler in response to detecting said load instruction corresponds to said simple load instruction; and convey a superforward signal to said scheduler in response to detecting said load instruction corresponds to said simple load instruction and said source operand corresponds to said destination operand.

20. The microprocessor of claim 14, wherein said execution unit includes a register file coupled to said plurality of execution pipelines and said scheduler, wherein said register file is configured to:

store said load data; and convey said load data to said first one of said plurality of execution pipelines in response to said scheduler conveying said subsequent instruction to said first one of said plurality of execution pipelines.

21. A computer system, comprising:

a microprocessor including:

a load/store unit; and a execution unit coupled to said load/store unit, wherein said execution unit includes:

a plurality of execution pipelines; and a scheduler coupled to said plurality of execution pipelines, wherein said scheduler is configured to receive a load instruction, wherein said load instruction specifies a destination operand, wherein said scheduler is configured to receive a subsequent instruction, wherein said subsequent instruction is subsequent in program order to said load instruction, and wherein said subsequent instruction specifies a source operand that corresponds to said destination operand;

wherein said scheduler is configured to receive a load signal corresponding to said load instruction, and wherein said scheduler is configured to convey said subsequent instruction to a first one of said plurality of execution pipelines in response to detecting said load instruction corresponds to a simple load instruction and receiving said load signal; and wherein said load/store unit is configured to convey a load tag and load data corresponding to said load instruction to said execution unit; and an input/output (I/O) device coupled to said microprocessor and to another computer system, wherein said I/O device is configured to communicate between said microprocessor and said another computer system.

22. The computer system as recited in claim 21, wherein said I/O device comprises a modem.

* * * * *